United States Patent

[11] 3,627,772

[72] Inventors: Kurt Freter, Beaconsfield, Quebec, Canada; Herbert Merz; Hans-Detlef Schroeder; Karl Zeile, all of Ingelheim, Rhine, Germany
[21] Appl. No.: 876,570
[22] Filed: Nov. 13, 1969
[45] Patented: Dec. 14, 1971
[73] Assignee: Boehringer Ingelheim GmbH, Ingelheim am Rhine, Germany
Continuation-in-part of application Ser. No. 859,519, July 28, 1969, now abandoned, which is a continuation of application Ser. No. 427,478, Jan. 22, 1965, now abandoned. This application Nov. 13, 1969, Ser. No. 876,570

[54] 1-LOWER ALKENYL-4-PHENYL-4-CARBONYL-PIPERIDINE DERIVATIVES AND SALTS
7 Claims, No Drawings

[52] U.S. Cl. .................................................. 260/294.3 E, 260/293.4 A, 260/294.7 J, 360/294.3 A, 260/456 P, 260/583 G, 260/293 E, 260/294 S, 424/267
[51] Int. Cl. ......................................................... C07d 29/24
[50] Field of Search .......................................... 260/294.7 J, 294.3 X, 293.41, 294.3 A

[56] References Cited
UNITED STATES PATENTS
3,117,139  1/1964  Mooradian ............... 260/294.3 X
3,135,760  6/1964  Zeile et al. ................. 260/294.3 X
FOREIGN PATENTS
936,268  9/1963  Great Britain ............. 260/294.3 X
OTHER REFERENCES
J. Am. Pharm. Assoc. Vol. 39, pages 245, 247–248, May 1950, Eddy Bull. Wld. Hlth. Org., Vol. 13, pages 937, 957–964, 1955, Braenden et al.
Endeavour, Vol. 23, pages 97–101, May 1964, Bentley
J. Chem. Soc., 1948, pages 559–561, Thorp et al.

Primary Examiner—Henry R. Jiles
Assistant Examiner—S. D. Winters
Attorney—Hammond & Littell ABSTRACT: Compounds of the formula

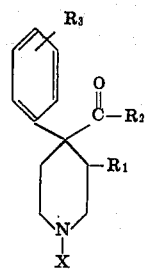

wherein
$R_1$ is hydrogen, α-methyl or β-methyl,
$R_2$ is methyl, ethyl, n-propyl, methoxy, ethoxy or n-propoxy,
$R_3$ is methyl, hydroxyl, methoxy, acetoxy, fluorine, chlorine or bromine, and
X is —$CH_2$—CH=CHBr, —$CH_2$—CH=CHCl,
—$CH_2$—CCl=$CH_2$, —$CH_2$—CBr=$CH_2$,
—$CH_2$—CH=$CCl_2$, —$CH_2$—CH=$CBr_2$,
—$CH_2$—CH=C($CH_3$)$_2$, —$CH_2$—C($CH_3$)=$CH_2$,
—CH($CH_3$)—CH=$CH_2$ or
—$CH_2$—CH=CH($CH_3$), provided, however, that when X is —$CH_2$—CH=CHCl, $R_2$ is other than ethyl and $R_3$ is other than 3-hydroxyl, and non-toxic, pharmacologically acceptable acid addition stalts thereof, useful as morphine-antgonistic analgesics.

1-LOWER ALKENYL-4-PHENYL-4-CARBONYL-PIPERIDINE DERIVATIVES AND SALTS

This is a continuation-in-part of copending application Ser. No. 859,519, filed July 28, 1969, now abandoned, which in turn is a continuation of copending application Ser. No. 427,478, filed Jan. 22, 1965, now abandoned.

This invention relates to novel 1-lower alkenyl-4-phenyl-4-carbonyl-piperidine derivatives and acid addition salts thereof, as well as to various methods of preparing these compounds.

More particularly, the present invention relates to compounds of the formula

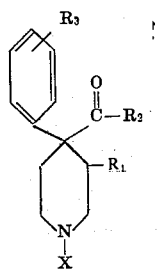

wherein
$R_1$ is hydrogen, α-methyl or β-methyl,
$R_2$ is methyl, ethyl, n-propyl, methoxy, ethoxy or n-propoxy,
$R_3$ is methyl, hydroxyl, methoxy, acetoxy, fluorine, chlorine or bromine, and
X is
—$CH_2$—CH=CHBr,
—$CH_2$—CH=CHCl,
—$CH_2$—CCl=$CH_2$,
—$CH_2$—CBr=$CH_2$,
—$CH_2$—CH=$CCl_2$,
—$CH_2$—CH=$CBr_2$,
—$CH_2$—CH=C($CH_3$)$_2$,
—$CH_2$—C($CH_3$)=$CH_2$,
—CH($CH_3$)—CH=$CH_2$ or
—$CH_2$—CH=CH($CH_3$), provided, however, that when X is —$CH_2$—CH=CHCl, $R_2$ is other than ethyl and $R_3$ is other than 3-hydroxyl, and nontoxic, pharmacologically acceptable acid addition salts thereof.

The compounds according to the present invention may be prepared by various methods involving well known chemical principles. However, the following have been found to be most convenient and efficient.

METHOD A

By reacting a secondary piperidine derivative of the formula

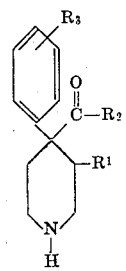

wherein $R_1$, $R_2$ and $R_3$ have the same meanings as in formula I, with a lower alkene derivative of the formula

Z—X    (III)

wherein X has the same meanings as in formula I and Z is halogen or p-toluene sulfonyloxy.

The reaction is preferably carried out in the presence of a suitable inert organic solvent and of a weak base, such as sodium bicarbonate, at a temperature between 50 and 150° C. The reactants may be used in a molar ratio of 1:1, but it is preferred to provide an excess of the lower alkene derivative III. Preferred inert organic solvents are lower alkanols or a mixture of dimethyl formamide and tetrahydrofuran.

In the preparation of N-haloalkenyl-piperidines of the formula I by this method the halo-substituted lower alkene derivative III may be a mixture of the cis- and trans-stereoisomers, or it may be the pure cis- or trans-stereoisomer. In the event that starting compound III is a mixture of the stereoisomers, the end product of the formula I will also be a mixture of the cis- and trans-stereoisomers which may, if desired, subsequently be separated into its pure stereoisomeric components by customary methods, such as by crystallization. On the other hand, if the starting compound III is the pure cis- or trans-stereoisomer, the end product I will be the corresponding pure cis- or trans-N-haloalkenyl-piperidine derivative, respectively.

METHOD B

By reacting a di-(β-haloethyl)-lower alkenyl-amine of the formula

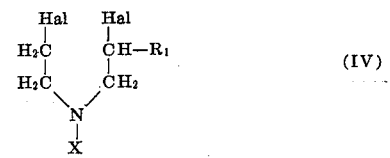

wherein $R_1$ and X have the same meanings as in formula I and Hal is a halogen, with a benzyl cyanide of the formula

wherein $R_3$ has the same meanings as in formula I, to form an intermediate 1-lower alkenyl-4-cyano-4-phenyl-piperidine compound of the formula

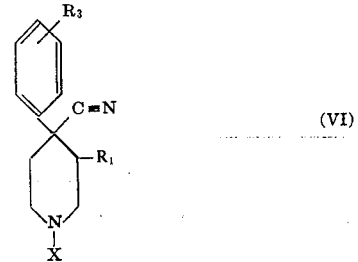

wherein $R_1$, $R_3$ and X have the same meanings as in formula I, and thereafter converting the 4-cyano group of said intermediate VI into an ester or keto group of the formula

wherein $R_2$ has the same meanings as in formula I, by conventional methods.

The ring closure reaction between compounds IV and V is carried out in the presence of a suitable condensation catalyst, such as sodium amide, and of an inert organic solvent, such as toluene, at a temperature between 40° and 200° C.

In order to convert the 4-cyano group in intermediate compound VI into an alkoxycarbonyl group, i.e. to obtain an end product of the formula I wherein $R_2$ is alkoxy, the intermediate 4-cyano-piperidine compound is first hydrolized with an aqueous acid or alkali, and the 4-carboxyl hydrolysis product is then esterified with the desired alkanol.

For conversion of the intermediate 4-cyano compound VI into an end product of the formula I wherein $R_2$ is alkyl, the intermediate compound VI is first reacted with a corresponding Grignard reagent in the presence of a suitable organic solvent, and the 4-ketimine formed thereby is subsequently hydrolized.

If $R_3$ in the end product of the formula I is to be a hydroxyl group, it is necessary to protect the analogous hydroxyl substituent in the benzyl cyanide V by acylation or alkylation prior to subjecting compound V to the ring closure condensation reaction with compound IV. The deacylation of a hydroxyl group thus protected takes place automatically and simultaneously with the acid or alkaline hydrolysis of the cyano group of the intermediate VI or with the hydrolysis of the ketimine intermediate in the preparation of a 4-keto compound ($R_2$=alkyl) of the formula I.

If the phenyl ring in the cyano compound VI comprises a hydroxyl substituent which has been protected with an alkyl radical, it is advantageous to effect the hydrolysis of the cyano group or the ketimine group with the aid of hydrobromic acid or hydroiodic acid, because the protective alkyl group is simultaneously split off thereby.

A hydroxyl substituent attached to an end product of the formula I obtained by Method A or B above may, if desired, be subsequently methylated or acylated and, conversely, a methoxy group or acetyl group attached to the phenyl moiety may subsequently be demethylated or hydrolized, respectively, all by conventional methods.

The N-lower alkenyl-piperidine derivatives of the formula I above are bases and, therefore, form nontoxic acid addition salts with inorganic and organic acids. Such acid addition salts are obtained by conventional methods; for example, by dissolving the free base in a suitable solvent and acidifying the solution with one or more molar equivalents of the desired acid. Examples of nontoxic, pharmacologically acceptable acid addition salts of the N-lower alkenyl-piperidine derivatives according to the present invention are those formed with hydrochloric acid, hydrobromic acid, sulfuric acid, phosphoric acid, acetic acid, methanesulfonic acid, tartaric acid, fumaric acid, maleic acid, citric acid, ascorbic acid, caproic acid, propionic acid, 8-chlorotheophylline and the like.

Examples of specific N-lower alkylene-piperidine derivatives of the formula I, stereoisomers and stereoisomeric mixtures thereof, and their nontoxic, pharmacologically acceptable acid addition salts, especially the hydrochlorides, which may be prepared by the methods described above are the following:

(1) 1-3'-chloroallyl)-4-(2''-methylphenyl)-4-acetyl-piperidine.
(2) Trans-1-(3'-chloroallyl)-4-(3''-methylphenyl)-4-ethoxycarbonyl-piperidine.
(3) Trans-1-(3'-chloroallyl)-4-(2''-chlorophenyl)-4-propionyl-piperidine.
(4) 1-(3'-chloroallyl)-4-(3''-chlorophenyl)-4-methoxycarbonyl-piperidine.
(5) 1-(3'-chloroallyl)-4-(3''-chlorophenyl)-4-ethoxycarbonyl-piperidine.
(6) 1-(3'-chloroallyl)-4-(4''-chlorophenyl)-4-propionyl-piperidine.
(7) 1-(3'-chloroallyl)-4-(4''-chlorophenyl)-4-methoxycarbonyl-piperidine.
(8) 1-(2'-bromoallyl)-4-(4''-chlorophenyl)-4-propionyl-piperidine.
(9) 1-(3', 3'-dichloroallyl)-4-(3''-methylphenyl)-4-methoxycarbonyl-piperidine.
(10) 1-(3'-chloroallyl)-4-(3''-hydroxyphenyl)-4-acetyl-piperidine.
(11) 1-(3'-chloroallyl)-4-(3''-hydroxyphenyl)-4-methoxycarbonyl-piperidine.
(12) 1-(3'-chloroallyl)-4-(3''-hydroxyphenyl)-4-ethoxycarbonyl-piperidine.
(13) 1-(3', 3'-dichloroallyl)-4-(3''-hydroxyphenyl)-4-methoxycarbonyl-piperidine.
(14) 1-(3', 3'-dibromoallyl)-4-(3'-hydroxyphenyl)-4-methoxycarbonyl-piperidine.
(15) 1-(3', 3'-dimethylallyl)-4-(3''-methylphenyl)-4-propionyl-piperidine.
(16) 1-(3', 3'-dimethylallyl)-4-(3''-methylphenyl)-4-methoxycarbonyl-piperidine.
(17) 1-(3', 3'-dimethylallyl)-4-(3'', 4''-dimethylphenyl)-4-propionyl-piperidine.
(18) 1-(3', 3'-dimethylallyl)-4-(3''-chlorophenyl)-4-methoxycarbonyl-piperidine.
(19) 1-(3', 3'-dimethylallyl)-4-(4''-chlorophenyl)-4-propionyl-piperidine.
(20) 1-(2'-methylallyl)-4-(4''-methylphenyl)-4-ethoxycarbonyl-piperidine.
(21) 1-(2'-methylallyl)-4-(3''-bromophenyl)-4-acetyl-piperidine.
(22) 1-(2'-methylallyl)-4-(3''-chlorophenyl)-4-propionyl-piperidine.
(23) 1-(2'-methylallyl)-4-(3''-chlorophenyl)-4-ethoxycarbonyl-piperidine.
(24) 1-(2'-methylallyl)-4-(4''-chlorophenyl)-4-propionyl-piperidine.
(25) 1-(2'-methylallyl)-4-(4''-chlorophenyl)-4-methoxycarbonyl-piperidine.
(26) 1-(2'-methylallyl)-4-(4''-chlorophenyl)-4-ethoxycarbonyl-piperidine.
(27) 1-(2'-methylallyl)-4-(3''-fluorophenyl)-4-methoxycarbonyl-piperidine.
(28) 1-(1'-methylallyl)-4-(3''-methylphenyl)-4-ethoxycarbonyl-piperidine.
(29) 1-(3', 3'-dimethylallyl)-4-(3''-hydroxyphenyl)-4-acetyl-piperidine.
(30) 1-(3', 3'-dimethylallyl)-4-(3''-hydroxyphenyl)-4-propionyl-piperidine. (31) 1-(3', 3'-dimethylallyl)-4-(3''-hydroxyphenyl)-4-methoxycarbonyl-piperidine.
(32) 1-(3', 3'-dimethylallyl)-4-(3''-hydroxyphenyl)-4-ethoxycarbonyl-piperidine.
(33) 1-(3', 3'-dimethylallyl)-3α-methyl-4-(3''-hydroxyphenyl)-4-propionyl-piperidine.
(34) 1-(3', 3'-dimethylallyl)-3α-methyl-4-(3''-hydroxyphenyl)-4-methoxycarbonyl-piperidine.

The following examples further illustrate the present invention and will enable others skilled in the art to understand it more completely. It should be understood, however, that the invention is not limited solely to the particular examples given below.

The absence of the prefix "trans" or "cis" from the nomenclature of those starting compounds or end products existing in stereoisomeric forms in the following examples as well as in the preceding list of compounds which may be prepared by Methods A and B signifies that a mixture of stereoisomers was used or obtained.

EXAMPLE 1

Preparation of 1-(3'-chloroallyl)-4-(2''-methylphenyl)-4-acetyl-piperidine hydrobromide by Method A 2.65 g. of 4-(2'-methylphenyl)-4-acetyl-piperidine hydrobromide were dissolved in 10 cc. of water, the solution was admixed with 10 cc. of 2 N sodium hydroxide, and the resulting alkaline aqueous mixture was extracted with ether. The ethereal phase was separated, dried over sodium sulfate and evaporated to dryness. The residue was dissolved in a mixture of 30 cc. tetrahydrofuran and 15 cc. dimethylformamide, and the solution was admixed with 1.3 g. of 1,3-dichloropropene-(2) and 1.5 g. of sodium carbonate. The resulting mixture was refluxed for 7 hours and thereafter evaporated to dryness in an aspirator vacuum, the residue was extracted with chloroform, the chloroform solution was dried and then evaporated, the residue was dissolved in methylene chloride containing 2 percent ethylacetate, and the solution was filtered through 60 g. of basic aluminum oxide (activity I). The solvent was then evaporated, the residue was taken up in about 5 cc. of methanol, and the solution was made weakly acid with ethereal hydrobromic acid. Thereafter, ether was added to the solution until it turned slightly cloudy, whereby a crystalline precipitate separated out, which was separated and recrystallized from a mixture of methanol and ether. 2.4 g. (62 percent of theory) of a compound having a melting point of 180°–182° C. were obtained. It was identified to be 1-(3'-chloroallyl)-4-(2''-methylphenyl)-4-acetyl-piperidine hydrobromide of the formula

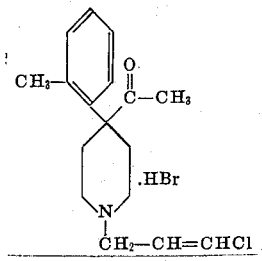

EXAMPLE 2

Preparation of 1-(3'-chloroallyl)-4-(3''-hydroxyphenyl)-4-acetyl-piperidine hydrochloride by method A 2.18 g. (0.010 mol) of 4-(3'-hydroxyphenyl)-4-acetyl-piperidine, 1.26 g. (0.015 mol) of sodium bicarbonate, 1.23 g. (0.011 mol) of 1,3-dichloropropene-(2), 10 cc. of dimethylformamide and 25 cc. of tetrahydrofuran were admixed with each other, and the mixture was refluxed for 2 hours. Thereafter, the solvent medium was evaporated in vacuo, and the residue was rinsed with 50 cc. of chloroform into a separating funnel. The chloroform solution was shaken three times with 20 cc. portions of water, dried over sodium sulfate and then evaporated in vacuo. The residue was taken up in methanol, the resulting solution was acidified with 4 cc. of 2.5 N ethanolic hydrochloric acid, and the acid solution was admixed with ether until it turned cloudy. Upon scratching, a precipitate formed, the mixture was allowed to stand overnight, the precipitate was separated by vacuum filtration, washed with ether and dried. 1.8 g. (54.5 percent of theory) of a compound having a melting point of 184° C. (recrystallized from a mixture of methanol and ether) were obtained. It was identified to be 1-(3'-chloroallyl) -4-(3''-hydroxyphenyl)-4-acetyl-piperidine hydrochloride of the formula

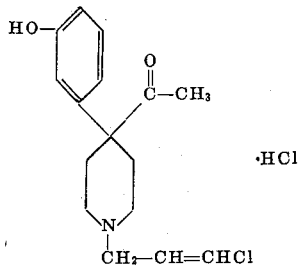

EXAMPLE 3

Preparation of trans-1-(3'-chloroallyl)-4-(3''-hydroxyphenyl) -4-methoxycarbonyl-piperidine hydrochloride by method A 5.44 g. (0.02 mol) of 4-(3'-hydroxyphenyl)-4-methoxycarbonyl-piperidine hydrochloride, 4.2 g. (0.05 mol) of sodium bicarbonate, 2.46 g. (0.022 mol) of trans-1,3-dichloropropene-(2), 10 cc. of dimethylformamide and 25 cc. of tetrahydrofuran were admixed with each other, and the mixture was refluxed for 2 hours. Thereafter, the solvent medium was evaporated in vacuo, and the residue was rinsed with 50 cc. of chloroform into a separating funnel. The chloroform solution was extracted three times with 20 cc. portions of water, then dried over sodium sulfate and evaporated in vacuo. The residue was taken up in methanol, the resulting solution was acidified with 4 cc. of 2.5 N ethanolic hydrochloric acid, and the acid solution was admixed with ether until it turned cloudy. It was allowed to stand overnight, and then the crystalline precipitate which had formed was filtered off. 5.9 g. (74.5 percent of theory) of a compound having a melting point of 217°–218° C. (recrystallized from a mixture of methanol and ether) were obtained. It was identified to be trans-1-(3'-chloroallyl)-4-(3''-hydroxyphenyl)-4-methoxycarbonyl-piperidine hydrochloride of the formula

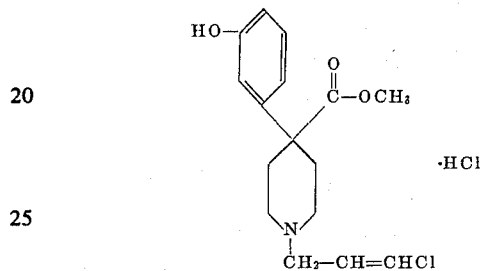

EXAMPLE 4

Preparation of cis-1-(3'-chloroallyl)-4-(3''-hydroxyphenyl) -4-methoxycarbonyl-piperidine hydrochloride by method A 5.44 g. (0.02 mol) of 4-(3'-hydroxyphenyl)-4-methoxycarbonyl-piperidine hydrochloride, 4.2 g. (0.05 mol) of sodium bicarbonate, 2.46 g. (0.022 mol) of cis-1,3-dichloropropene-(2), 10 cc. of dimethylformamide and 25 cc. of tetrahydrofuran were admixed with each other, and the mixture was refluxed for 2 hours. Thereafter, the solvent medium was evaporated in vacuo, and the residue was rinsed with 50 cc. of chloroform into a separating funnel. The chloroform solution was extracted three times with 20 cc. portions of water, then dried over sodium sulfate, and finally evaporated in vacuo. The residue was taken up in methanol, the resulting solution was acidified with 4 cc. of 2.5 N ethanolic hydrochloric acid, and the acid solution was admixed with ether until it turned cloudy. It was then allowed to stand overnight, and the crystalline precipitate formed thereby was filtered off. 6.1 g. (77 percent of theory) of cis-1-(3'-chloroallyl)-4-(3''-hydroxyphenyl)-4-methoxy carbonyl-piperidine hydrochloride, m.p. 197°–198° C. (recrystallized from a mixture of methanol and ether), were obtained.

EXAMPLE 5

Preparation of 1-(3'-chloroallyl)-4-(3''-hydroxyphenyl)-4-ethoxycarbonyl-piperidine hydrochloride by method A 2.86 g. (0.01 mol) of 4-(3'-hydroxyphenyl)-4-ethoxycarbonyl-piperidine hydrochloride, 2.10 g. (0.025 mol) of sodium bicarbonate, 1.23 g. of 1,3-dichloropropene-(2), 10 cc. of dimethylformamide and 25 cc. of tetrahydrofuran were admixed with each other, and the mixture was refluxed for 2 hours. Thereafter, the solvent medium was evaporated in vacuo, and the residue was rinsed with 50 cc. of chloroform into a separating funnel. The chloroform solution was extracted three times with 20 cc. portions of water, dried over sodium sulfate and evaporated in vacuo. The residue was taken up in methanol, the resulting solution was acidified with 4 cc. of 2.5 N ethanolic hydrochloric acid, and the acid solution was admixed with ether until it turned cloudy. 2.3 g. (64 percent of theory) of a compound having a melting point of 207° C. (recrystallized from a mixture of ethanol and ether) were obtained. It was identified to be 1-(3'-chloroallyl)-4-(3''-hydroxyphenyl)-4-ethoxycarbonyl-piperidine hydrochloride of the formula

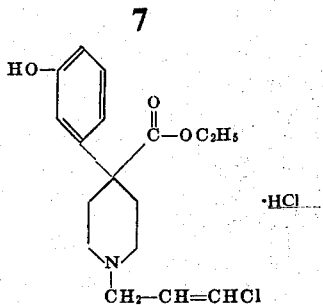

EXAMPLE 6

Preparation of 1-(3'-chloroallyl)-4-(3''-methoxyphenyl)-4-ethoxycarbonyl-piperidine hydrochloride 3.74 g. (0.01 mol) of 1-(3'-chloroallyl)-4-(3''-hydroxyphenyl)-4-ethoxycarbonyl-piperidine hydrochloride (the end product of example 5) were shaken in a separating funnel with a mixture consisting of 50 cc. of chloroform, 25 cc. of water and 10 cc. of 2 N aqueous ammonia. The chloroform phase was then separated, washed with 25 cc. of water, dried over sodium sulfate and evaporated in vacuo. The residue was dissolved in 25 cc. of tetrahydrofuran, and the resulting solution was admixed with a solution of 0.0125 mol of diazomethane in ether. After 4 hours of standing the solvent medium was evaporated, the residue was taken up in chloroform, the resulting solution was washed twice with 2 N sodium hydroxide and then with water, dried over sodium sulfate, the chloroform was evaporated, the residue was dissolved in 15 cc. of ethanol, and the resulting solution was acidified with 4 cc. of 2.5 N ethanolic hydrochloric acid. The acid solution was thereafter admixed with ether until it turned cloudy. 2.5 g. (64.5 percent of theory) of a compound having a melting point of 161.5° C. (recrystallized from a mixture of ethanol and ether) were obtained. It was identified to be 1-(3'-chloroallyl)-4-(3''-methoxyphenyl)-4-ethoxycarbonyl-piperidine hydrochloride of the formula

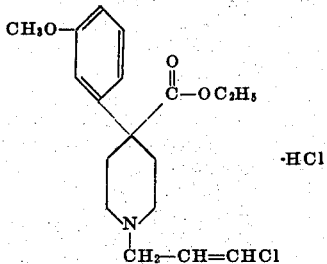

EXAMPLE 7

Preparation of cis-1-(3'-chloroallyl)-4-(3''-acetoxyphenyl)-4-methoxycarbonyl-piperidine hydrochloride 4.5 g. (0.013 mol) of cis-1-(3'-chloroallyl)-4-3''-hydroxyphenyl)-4-methoxycarbonyl-piperidine hydrochloride (the end product of Example 4) were dissolved by stirring in a mixture consisting of 50 cc. of absolute pyridine and 5 cc. of acetic acid anhydride (which took about 10 minutes), and the resulting solution was allowed to stand for 12 hours at room temperature under exclusion of moisture. Thereafter, the reaction solution was evaporated in vacuo, the residue was extracted by shaking with a mixture consisting of 75 cc. of ether, 50 cc. of water, 50 g. of ice and 20 cc. of 2 N sodium hydroxide, the ether phase was separated, and the aqueous phase was again extracted with 75 cc. of ether. The ether extract solutions were combined, washed three times with ice water, dried over sodium sulfate, and evaporated in vacuo. The residue was dissolved in 50 cc. of absolute ether, and the resulting solution was acidified 7 cc. of 2.5 N ethanolic hydrochloric acid. The crystalline precipitate formed thereby was separated by vacuum filtration and washed with absolute ether. 4.9 g. (97 percent of theory) of a compound having a melting point of 173° C. (recrystallized from a mixture of methanol and ether) were obtained. It was identified to be cis-1-(3'-chloroallyl)-4-(3''-acetoxyphenyl)-4-methoxycarbonyl-piperidine hydrochloride of the formula

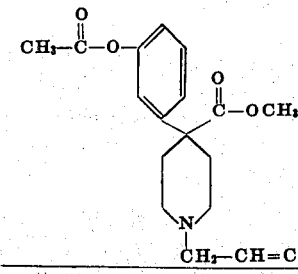

EXAMPLE 8

Using a procedure analogous to that described in example 1, 1-(3'-chloroallyl)-4-(2''-methylphenyl)-4-propionyl-piperidine hydrochloride, m.p. 215°–217° C., of the formula

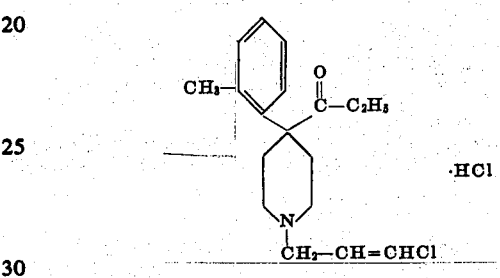

was prepared from 4-(2'-methylphenyl)-4-propionyl-piperidine hydrochloride and 1,3-dichloropropene-(2). The yield was 2.0 g. (58 percent of theory).

EXAMPLE 9

Using a procedure analogous to that described in example 1, 1-(3'-chloroallyl)-4-(3''-methylphenyl)-4-acetyl-piperidine hydrochloride, m.p. 208°–210° C., was prepared from 4-(3''-methylphenyl)-4-acetyl-piperidine hydrochloride and 1,3-dichloropropene-(2). The yield was 2.2 g. (67 percent of theory).

EXAMPLE 10

Using a procedure analogous to that described in example 1, 1-(3'-chloroallyl)-4-(3''-methylphenyl)-4-propionyl-piperidine hydrochloride, m.p. 204°–207° C., was prepared from 4-(3'-methylphenyl)-4-propionyl-piperidine hydrochloride and 1,3-dichloropropene-(2) (reflux time: 11.5 hours). The yield was 2.0 g. (56 percent of theory).

EXAMPLE 11

Using a procedure analogous to that described in example 1, 1-(3'-chloroallyl)-4-(3''-methylphenyl)-4-methoxycarbonyl-piperidine hydrochloride, m.p. 195°–196° C., was prepared from 4-(3'-methylphenyl)-4-methoxycarbonyl-piperidine hydrochloride and 1,3-dichloropropene-(2) (reflux time: 11.5 hours). The yield was 2.0 g. (58 percent of theory).

EXAMPLE 12

Using a procedure analogous to that described in example 1, trans-1-(3'-chloroallyl)-4-(3''-methylphenyl)-4-ethoxycarbonyl-piperidine hydrochloride, m.p. 209°–211° C., was prepared from 4-(3'-methylphenyl)-4-ethoxycarbonyl-piperidine hydrochloride and trans-1,3-dichloropropene-(2) (reflux time: 9 hours). The yield was 1.9 g. (53 percent of theory).

EXAMPLE 13

Using a procedure analogous to that described in example 1, cis-1-(3'-chloroallyl)-4-(3''-methylphenyl)-4-ethoxycarbonyl-piperidine hydrochloride, m.p. 140°–142° C., was prepared from 4-(3'-methylphenyl)-4-ethoxycarbonyl-piperidine hydrochloride and cis-1,3-dichloropropene-(2)

EXAMPLE 14

Using a procedure analogous to that described in example 1, 1-(3'-chloroallyl)-4-(4''-methylphenyl)-4-acetyl-piperidine hydrochloride, m.p. 221°–225° C., of the formula

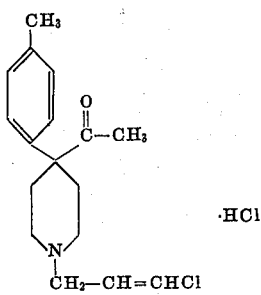

was prepared from 4-(4'-methylphenyl)-4-acetyl-piperidine hydrochloride and 1,3-dichloropentene-(2). The yield was 1.5 g. (46 percent of theory).

EXAMPLE 15

Using a procedure analogous to that described in example 1, 1-(3'-chloroallyl)-4-(4''-methylphenyl)-4-propionyl-piperidine hydrochloride, m.p. 223°–228° C., was prepared from 4-(4'-methylphenyl)-4-propionyl-piperidine hydrochloride and 1,3-dichloropropene-(2). The yield was 1.8 g. (53 percent of theory).

EXAMPLE 16

Using a procedure analogous to that described in example 1, 1-(3'-chloroallyl)-4-(4''-methylphenyl)-4-methoxycarbonyl-piperidine hydrochloride, m.p. 201°–203° C., was prepared from 4-(4'-methylphenyl)-4-methoxycarbonyl-piperidine hydrochloride and 1,3-dichloropropene-(2). The yield was 2.1 g. (61 percent of theory).

EXAMPLE 17

Using a procedure analogous to that described in example 1, 1-(3'-chloroallyl)-4-(4''-methylphenyl)-4-ethoxycarbonyl-piperidine hydrochloride, m.p. 194°–197° C., was prepared from 4-(4'-methylphenyl)-4-ethoxycarbonyl-piperidine hydrochloride and 1,3-dichloropropene-(2). The yield was 1.8 g. (50 percent of theory).

EXAMPLE 18

Using a procedure analogous to that described in example 1, trans-1-(3'-chloroallyl)-4-(2''-chlorophenyl)-4-acetyl-piperidine hydrochloride, m.p. 192°–193° C., of the formula

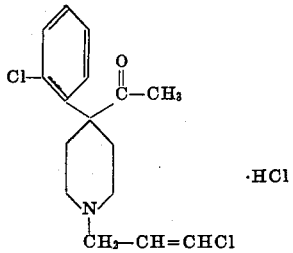

was prepared from 4-(2'-chlorophenyl)-4-acetyl-piperidine hydrochloride and trans-1,3-dichloropropene-(2). The yield was 3.2 g. (92 percent of theory).

EXAMPLE 19

Using a procedure analogous to that described in example 1, trans-1-(3'-chloroallyl)-4-(2''-chlorophenyl)-4-propionyl-piperidine hydrochloride, m.p. 217°–218° C., was prepared from 4-(2'-chlorophenyl)-4-propionyl-piperidine hydrochloride and trans-1,3-dichloropropene-(2). The yield was 1.2 g. (33 percent of theory).

EXAMPLE 20

Using a procedure analogous to that described in example 1, 1-(3'-chloroallyl)-4-(3''-chlorophenyl)-4-acetyl-piperidine hydrochloride, m.p. 192°–193° C., of the formula

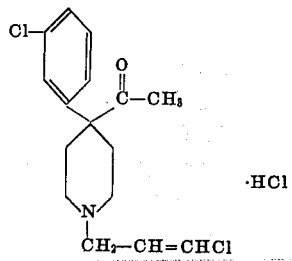

was prepared from 4-(3'-chlorophenyl)-4-acetyl-piperidine hydrochloride and 1,3-dichloropropene-(2). The yield was 1.9 g. (55 percent of theory).

EXAMPLE 21

Using a procedure analogous to that described in example 1, 1-(3'-chloroallyl)-4-(3''-chlorophenyl)-4-propionyl-piperidine hydrochloride, m.p. 238°–239° C., was prepared from 4-(3'-chlorophenyl)-4-propionyl-piperidine hydrochloride and 1,3-dichloropropene-(2). The yield was 1.8 g. (50 percent of theory).

EXAMPLE 22

Using a procedure analogous to that described in example 1, 1-(3'-chloroallyl)-4-(3''-chlorophenyl)-4-methoxycarbonyl-piperidine hydrochloride, m.p. 195°–197° C., was prepared from 4-(3'-chlorophenyl)-4-methoxycarbonyl-piperidine hydrochloride and 1,3-dichloropropene-(2). The yield was 1.8 g. (49 percent of theory).

EXAMPLE 23

Using a procedure analogous to that described in example 1, 1-(3'-chloroallyl)-4-(3''-chlorophenyl)-4-ethoxycarbonyl-piperidine hydrochloride, m.p. 211°–213° C., was prepared from 4-(3'-chlorophenyl)-4-ethoxycarbonyl-piperidine hydrochloride and 1,3-dichloropropene-(2). The yield was 1.9 g. (50 percent of theory).

EXAMPLE 24

Using a procedure analogous to that described in example 1, 1-(3'-chloroallyl)-4-(4''-chlorophenyl)-4-acetyl-piperidine hydrochloride, m.p. 198°–200° C., of the formula

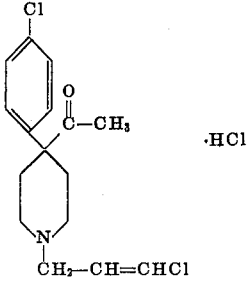

was prepared from 4-(4'-chlorophenyl)-4-acetyl-piperidine hydrochloride and 1,3-dichloropropene-(2). The yield was 1.9 g. (55 percent of theory).

EXAMPLE 25

Using a procedure analogous to that described in example 1, 1-(3'-chloroallyl)-4-(4''-chlorophenyl)-4-propionyl-piperidine hydrochloride, m.p. 225°–256° C., was prepared from 4-(4'-chlorophenyl)-4-propionyl-piperidine hydrochloride and 1,3-dichloropropene-(2). The yield was 1.5 g. (41 percent of theory).

EXAMPLE 26

Using a procedure analogous to that described in example 1, 1-(3'-chloroallyl)-4-(4''-chlorophenyl)-4-methoxycarbonyl-piperidine hydrochloride, m.p. 199°–200° C., was prepared from 4-(4'-chlorophenyl)-4-methoxycarbonyl-piperidine hydrochloride and 1,3-dichloropropene-(2). The yield was 2.0 g. (55 percent of theory).

EXAMPLE 27

Using a procedure analogous to that described in example 1, 1-(3'-chloroallyl)-4-(4''-chlorophenyl)-4-ethoxycarbonyl-piperidine hydrochloride, m.p. 219°–221° C., was prepared from 4-(4'-chlorophenyl)-4-ethoxycarbonyl-piperidine hydrochloride and 1,3-dichloropropene-(2). The yield was 2.1 g. (55 percent of theory).

EXAMPLE 28

Using a procedure analogous to that described in example 1, 1-(2'-chloroallyl)-4-(3''-chlorophenyl)-4-methoxycarbonyl-piperidine hydrochloride, m.p. 194°–196° C., of the formula

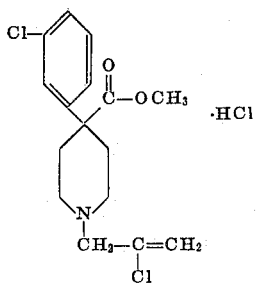

was prepared from 4-(3'-chlorophenyl)-4-methoxycarbonyl-piperidine hydrochloride and 1-bromo-2-chloropropene-(2) (reflux time: 3 hours). The yield was 3.5 g. (96 percent of theory).

EXAMPLE 29

Using a procedure analogous to that described in example 1, 1-(2'-bromoallyl)-4-(2''-methylphenyl)-4-acetyl-piperidine hydrobromide, m.p. 209°–211° C., of the formula

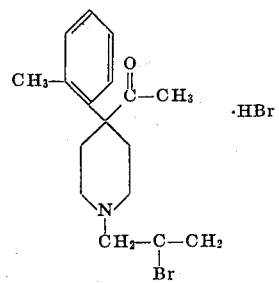

was prepared from 4-(2'-methylphenyl)-4-acetyl-piperidine hydrochloride and 1,3-dibromopropene-(2) (reflux time: 2.5 hours). The yield was 3.2 g. (77 percent of theory).

EXAMPLE 30

Using a procedure analogous to that described in example 1, 1-(2'-bromoallyl)-4-(3''-methylphenyl)-4-acetyl-piperidine hydrobromide, m.p. 187°–189° C., was prepared from 4-(3'-methylphenyl)-4-acetyl-piperidine hydrochloride and 1,3-dibromopropene-(2) (reflux time: 2.5 hours). The yield was 2.2 g. (53 percent of theory).

EXAMPLE 31

Using a procedure analogous to that described in example 1, 1-(2'-bromoallyl)4-(3''-methylphenyl)-4-methoxycarbonyl-piperidine hydrochloride, m.p. 203°–204° C., was prepared from 4-(3'-methylphenyl)-4-methoxycarbonyl-piperidine hydrochloride and 1,3-dibromopropene-(2) (reflux time: 2.5 hours). The yield was 3.1 g. (80 percent of theory).

EXAMPLE 32

Using a procedure analogous to that described in example 1, 1-(2'-bromoallyl)-4-(3''-methylphenyl)-4-ethoxycarbonyl-piperidine hydrochloride, m.p. 177°–178° C., was prepared from 4-(3'-methylphenyl)-4g. hydrochloride and 1,3-dibromopropene-(2) (reflux time: 2.5 hours). The yield was 3.9 g. (97 percent of theory).

EXAMPLE 33

Using a procedure analogous to that described in example, 1,1-(2'-bromoallyl)-4-(4''-methylphenyl)4-acetyl-piperidine hydrobromide, m.p. 229°–231° C., was prepared from 4-(4'-methylphenyl)-4-acetyl-piperidine hydrochloride and 1,3-dibromopropene-(2) (reflux time: 2.5 hours). The yield was 3.5 g. (84 percent of theory).

EXAMPLE 34

Using a procedure analogous to that described in example 1, 1-(2'-bromoallyl)-4-(4''-methylphenyl)-4-methoxycarbonyl-piperidine hydrobromide, m.p. 215°–217° C., was prepared from 4-(4'-methylphenyl)-4-methoxycarbonyl-piperidine hydrochloride and 1,3-dibromopropene-(2) (reflux time: 2.5 hours). The yield was 3.0 g. (69 percent of theory).

EXAMPLE 35

Using a procedure analogous to that described in example 1, 1-(2'-bromoallyl)-4-(3''-chlorophenyl)-4-acetyl-piperidine hydrobromide, m.p. 206°–208° C., was prepared from 4-(3'-chlorophenyl)-4-acetyl-piperidine hydrochloride and 1,3-dibromopropene-2) (reflux time: 2.5 hours). The yield was 3.6 g. (82 percent of theory).

EXAMPLE 36

Using a procedure analogous to that described in example 1, 1-(2'-bromoallyl)-4-(3''-chlorophenyl)-4-methoxycarbonyl-piperidine hydrochloride, m.p. 193°–195° C., was prepared from 4-(3'-chlorophenyl)-4-methoxycarbonyl-piperidine hydrochloride and 1,3-dibromopropene-(2) (reflux time: 2.5 hours). The yield was 4.0 g. (98 percent of theory).

EXAMPLE 37

Using a procedure analogous to that described in example 1, 1-(2'-bromoallyl)-4-(4''-chlorophenyl)-4-propionyl-piperidine hydrochloride, m.p. 217°–219° C., was prepared from 4-(4'-chlorophenyl)-4-propionyl-piperidine hydrochloride and 1,3-dibromopropene-(2) (reflux time: 2.5 hours). The yield was 2.9 g. (71 percent of theory).

EXAMPLE 38

Using a procedure analogous to that described in example 1, 1-(2'-bromoallyl)-4-(4''-chlorophenyl)-4-methoxycarbonyl-piperidine hydrochloride, m.p. 209°–210° C., was prepared from 4-(4'-chlorophenyl)-4-methoxycarbonyl-piperidine hydrochloride and 1,3-dibromopropene-(2) (reflux time: 2.5 hours). The yield was 3.5 g. (86 percent of theory).

EXAMPLE 39

Using a procedure analogous to that described in example 1, 1-(3', 3'-dichloroallyl)-4-(3''-methylphenyl)-4-acetyl-piperidine hydrochloride, m.p. 235°–238° C., of the formula

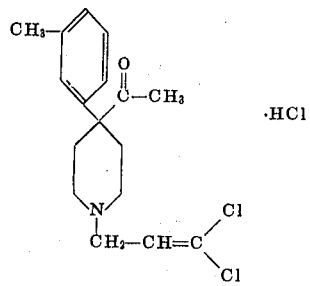

was prepared from 4-(3'-methylpheyl)-4-acetyl-piperidine hydrochloride and 1,3,3-trichloropropene-(2) (reflux time: 3 hours). The yield was 3.0 g. (83 percent of theory).

EXAMPLE 40

Using a procedure analogous to that described in example 1,1-(3', 3'-dichloroallyl)-4-(3''-methylphenyl)-4-methoxycarbonyl-piperidine hydrochloride, m.p. 218°–219° C., was prepared from 4-(3'-methylphenyl)-4-methoxycarbonyl-piperidine hydrochloride and 1,3,3-trichloropropene-(2) (reflux time: 3 hours). The yield was 3.7 g. (98 percent of theory).

EXAMPLE 41

Using a procedure analogous to that described in example 1, 1-(3', 3'-dichloroallyl)-4-(3''-chlorophenyl)-4-methoxycarbonyl-piperidine hydrochloride, m.p. 224°–225° C., was prepared from 4-(3'-chlorophenyl)-4-methoxycarbonyl-piperidine hydrochloride and 1,3,3-trichloropropene-(2) (reflux time: 3 hours). The yield was 3.0 g. (75 percent of theory).

EXAMPLE 42

Using a procedure analogous to that describe in example, 1, 1-(3', 3'-dibromoallyl)-4-(3''-chlorophenyl)-4-methoxycarbonyl-piperidine hydrobromide, m.p. 230°–232° C., of the formula

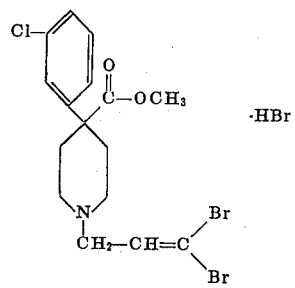

was prepared from 4-(3'-chlorophenyl)-4-methoxycarbonyl-piperidine hydrobromide and 1,3,3-tribromopropene-(2) (reflux time: 3 hours). The yield was 4.9 g. (92 percent of theory).

EXAMPLE 43

Using a procedure analogous to that described in example 2, 1-(3'-chloroallyl)-4-(3''-hydroxyphenyl)-4-butyryl-piperidine hydrochloride, m.p. 214° C., of the formula

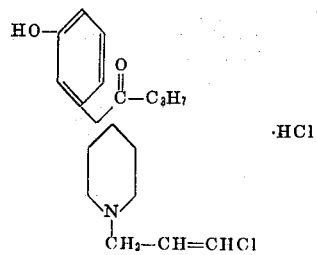

was prepared from 4-(3'-hydroxyphenyl)-4-butyryl-piperidine and 1,3-dichloropropene-(2). The yield was 2.1 g. (57 percent of theory).

EXAMPLE 44

Using a procedure analogous to that described in example 5, 1-(3'-chloroallyl)-4-(3''-hydroxyphenyl)-4-propoxycarbonyl-piperidine hydrochloride, m.p. 198° C., was prepared from 4-(3'-hydroxyphenyl)-4-propoxycarbonyl-piperidine hydrochloride and 1,3-dichloropropene-(2). The yield was 2.4 g. (64 percent of theory).

EXAMPLE 45

Using a procedure analogous to that described in example 5, 1-(3'-chloroallyl)-4-(3''-methoxyphenyl)-4-propionyl-piperidine hydrochloride, m.p. 163° C., of the formula

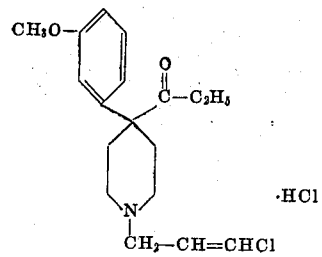

was prepared from 4-(3'-methoxyphenyl)-4-propionyl-piperidine hydrochloride and 1,3-dichloropropene-(2). The yield was 2.2 g. (61.5 percent of theory).

EXAMPLE 46

Using a procedure analogous to that described in example 5, 1-(3'-chloroallyl)-4-(3''-methoxyphenyl)-4-ethoxycarbonyl-piperidine hydrochloride, m.p. 161.5° C., was prepared from 4-(3'-methoxyphenyl)-4-ethoxycarbonyl-piperidine hydrochloride and 1,3-dichloropropene-(2). The yield was 2.3 g. (61.5 percent of theory).

EXAMPLE 47

Using a procedure analogous to that described in example 7, trans-1-(3'-chloroallyl)-4-(3''-acetoxyphenyl)-4-methoxycarbonyl-piperidine hydrochloride, m.p. 194° C., of the formula

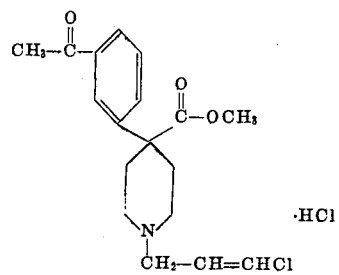

was prepared from 4-(3'-hydroxyphenyl)-4-methoxycarbonyl-piperidine hydrochloride and acetic acid anhydride. The yield was 4.9 g. (97 percent of theory).

EXAMPLE 48

Using a procedure analogous to that described in example 5, 1-(3'chloroallyl)-4-(2''-hydroxyphenyl)-4-methoxycarbonyl-piperidine hydrochloride, m.p. 230° C., of the formula

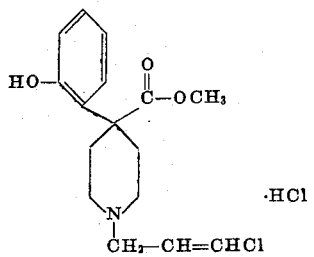

was prepared from 4-(2'-hydroxypheny)-4-methoxycarbonyl-piperidine hydrochloride and 1,3-dichloropropene-(2). The yield was 2.0 g. (56 percent of theory).

EXAMPLE 49

Using a procedure analogous to that described in example 5, 1-(3'-chloroallyl)-4-(4''-hydroxyphenyl)-4-methoxycarbonyl-piperidine hydrochloride, m.p. 215° C., was prepared from 4-(4'-hydroxyphenyl)-4-methoxycarbonyl-piperidine hydrochloride and 1,3-dichloropropene-(2). The yield was 2.6 g. (73 percent of theory).

EXAMPLE 50

Using a procedure analogous to that described in example 2, 1-(3'-chloroallyl)-3α-methyl-4-(3''-hydroxyphenyl)-4-propionyl-piperidine hydrochloride, m.p. 107° C., of the formula

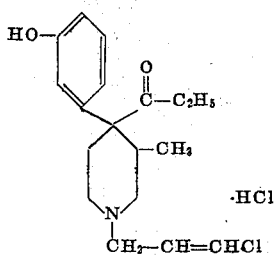

was prepared from 3α-methyl-4-(3''-hydroxyphenyl)-4-propionyl-piperidine and 1,3-dichloropropene-(2). The yield was 1.8 g. (50 percent of theory).

EXAMPLE 51

Using a procedure analogous to that described in example 4, cis-1-(3'-chloroallyl)-3α-methyl-4-(3''-hydroxyphenyl)-4-methoxycarbonyl-piperidine hydrochloride, m.p. 125–218° C., was prepared from 3α-methyl-4-(3'-hydroxyphenyl)-4-methoxycarbonyl-piperidine hydrochloride and cis-1,3-dichloropropene-(2). The yield was 2.0 g. (55.5 percent of theory).

EXAMPLE 52

Using a procedure analogous to that described in example 3, trans-1-(3'-chloroallyl)-3α-methyl-4-(3''-hydroxyphenyl)-4-methoxycarbonyl-piperidine hydrochloride, m.p. 154–158° C., was prepared from 3α-methyl-4-(3'-hydroxyphenyl)-4-methoxycarbonyl-piperidine hydrochloride and trans-1,3-dichloropropene-(2). The yield was 2.3 g. (64 percent of theory).

EXAMPLE 53

Using a procedure analogous to that described in example 3, trans-1-(3'-chloroallyl)-3α-methyl-4-(3''-hydroxyphenyl)-4-methoxycarbonyl-piperidine hydrochloride, m.p. 100°–103° C., was prepared from 3α-methyl-4-(3'-hydroxyphenyl)-4-methoxycarbonyl-piperidine hydrochloride and trans-1,3-dichloropropene-(2). The yield was 2.5 g. (69.5 percent of theory).

EXAMPLE 54

Using a procedure analogous to that described in example 4, cis-1-(3'-chloroallyl)-3β-methyl-4-(3''-hydroxyphenyl)-4-methoxycarbonyl-piperidine hydrochloride, m.p. 90°–95° C., was prepared from 3β-methyl-4-(3'-hydroxyphenyl)-4-methoxycarbonyl-piperidine hydrochloride and cis-1,3-dichloropropene-(2). The yield was 2.0 g. (55.5 percent of theory).

EXAMPLE 55

Using a procedure analogous to that described in example 2, 1-(2'-chloroallyl)-4-(3''-hydroxyphenyl)-4-acetyl-piperidine hydrochloride, m.p. 185° C., of the formula

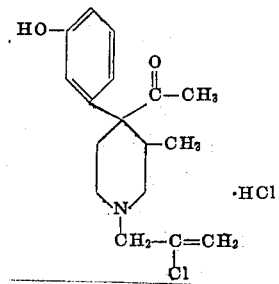

was prepared from 4-(3'-hydroxyphenyl)-4-acetyl-piperidine and 2,3-dichloropropene-(1). The yield was 2.6 g. (69 percent of theory).

EXAMPLE 56

Using a procedure analogous to that described in example 2, 1-(2'-chloroallyl)-4-(3''-hydroxyphenyl)-4-propionyl-piperidine hydrochloride, m.p. 183° C., was prepared from 4-(3'-hydroxyphenyl)-4-propionyl-piperidine and 2,3-dichloropropene-(1). The yield was 2.4 g. (70 percent of theory).

EXAMPLE 57

Using a procedure analogous to that described in example 5, 1-(2'-chloroallyl)-4-(3''-hydroxyphenyl)-4-methoxycarbonyl-piperidine hydrochloride, m.p. 181° C., was prepared from 4-(3'hydroxyphenyl)-4-methoxycarbonyl-piperidine hydrochloride and 2,3-dichloropropene-(1). The yield was 2.5 g. (72 percent of theory).

EXAMPLE 58

Using a procedure analogous to that described in example 5, 1-(2'chloroallyl)-4-(3''hydroxyphenyl-4-ethoxycarbonyl-piperidine hydrochloride, m.p. 189.5° C., was prepared from 4-(3'-hydroxypnenyl)-4-ethoxycarbonyl-piperidine hydrochloride and 2,3-dichloropropene-(1). The yield was 3.0 g. (83.5 percent of theory).

EXAMPLE 59

Using a procedure analogous to that described in example 2, 1-(3',3'-dichloroallyl)-4-(3''-hydroxyphenyl)-4-acetyl-piperidine hydrochloride, m.p. 207°–208° C., was prepared from 4-(3',3'-dichloroallyl)-4-(3''-hydroxyphenyl)-4-acetyl-piperidine and 1-bromo-3,3-dichloropropene-(2). The yield was 2.3 g. (63 percent of theory).

EXAMPLE 60

Using a procedure analogous to that described in example 2, 1-(3',3'-dichloroallyl)-1-(3''-hydroxyphenyl)-4propionyl-piperidine hydrochloride, m.p. 218°–219° C., was prepared from 4-(3'-hydroxyphenyl)-4-propionyl-piperidine and 1-bromo-3,3-dichloropropene-(2). The yield was 2.75 g. (73 percent of theory).

EXAMPLE 61

Using a procedure analogous to that described in example 5, 1-(3',3'-dichloroallyl)-4(3''-hydroxyphenyl)-4-methoxycarbonyl-piperidine hydrochloride, m.p. 189°–190° C., was prepared from 4-(3'-hydroxyphenyl)-4-methoxycarbonyl-piperidine hydrochloride and 1-bromo-3,3-dichloropropene-(2). The yield was 2.7 g. (71 percent of theory).

EXAMPLE 62

Using a procedure analogous to that described in example 5, 1-(3',3'-dichloroallyl)-4(3''-hydroxyphenyl)-4-ethoxycarbonyl-piperidine hydrochloride, m.p. 221°–222° C., was prepared from 4-(3'-hydroxyphenyl)-4-ethoxycarbonyl-piperidine hydrochloride and 1-bromo-3,3-dichloropropene-(2). The yield was 3.0 g. (76 percent of theory).

EXAMPLE 63

Using a procedure analogous to that described in example 2, 1-(2',3'-dichloroallyl)-4-(3''-hydroxyphenyl)-4-acetyl-piperidine hydrochloride, m.p. 195°–198° C., was prepared from 4-(3'-hdyroxyphenyl)-4-acetyl-piperidine and 1,2,3-trichlorpropene-(2). The yield was 1.7 g. (46.5 percent of theory).

EXAMPLE 64

Using a procedure analogous to that described in example 4, cis-1-(3'-bromoallyl)-4-(3''-hydroxyphenyl)-4-acetyl-piperidine hydrochloride, m.p. 183° C., of the formula

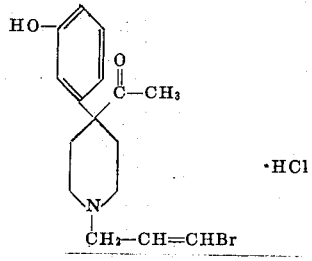

was prepared from 4-(3'-hydroxyphenyl)-4-acetyl-piperidine and cis-1,3-dibromopropene-(2). The yield was 1.8 g. (48 percent of theory).

EXAMPLE 65

Using a procedure analogous to that described in example 3, trans-1-(3'-bromoallyl)-4-(3''-hydroxyphenyl)-4-acetyl-piperidine hydrochloride, m.p. 195°–197° C., was prepared from 4-(3'-hydroxyphenyl)-4-acetyl-piperidine and trans-1,3-dibromopropene-(2). The yield was 1.8 g. (48 percent of theory).

EXAMPLE 66

Using a procedure analogous to that described in example 4, cis-1-(3'-bromoallyl)-4-(3''-hydroxyphenyl)-4-methoxycarbonyl-piperidine hydrochloride, m.p. 197° C., was prepared from 4-(3'-hydroxyphenyl)-4-methoxycarbonyl-piperidine hydrochloride and cis-1,3-dibromopropene-(2). The yield was 2.4 g. (61.5 percent of theory).

EXAMPLE 67

Using a procedure analogous to that described in example 3, trans-1-(3'-bromoallyl)-4-(3''-hydroxyphenyl)-4-methoxycarbonyl-piperidine hydrochloride, m.p. 212°–214° C., was prepared from 4-(3'-hydroxyphenyl)-4-methoxycarbonyl-piperidine hydrochloride and trans-1,3-dibromopropene-(2). The yield was 2.6 g. (66.5 percent of theory).

EXAMPLE 68

Using a procedure analogous to that described in example 2, 1-(2'-bromoallyl)-4-(3''-hydroxyphenyl)-4-acetyl-piperidine hydrochloride, m.p. 179°–180° C., of the formula

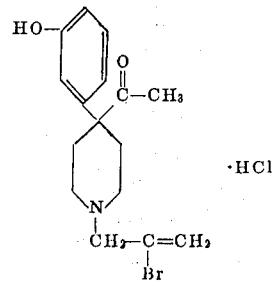

was prepared from 4-(3'-hydroxyphenyl)-4-acetyl-piperidine and 1,2-dibromopropene-(2). The yield was 2.6 g. (69.5 percent of theory).

EXAMPLE 69

Using a procedure analogous to that described in example 2, 1-(2'-bromoallyl)-4-(3''-hydroxyphenyl)-4-propionyl-piperidine hydrochloride, m.p. 180°–181° C., was prepared from 4-(3'-hydroxyphenyl)-4-propionyl-piperidine and 1,2-dibromopropene-(2). The yield was 2.7 g. (70 percent of theory).

EXAMPLE 70

Using a procedure analogous to that described in example 5, 1-(2'-bromoallyl)-4-(3''-hydroxyphenyl)-4-methoxycarbonyl-piperidine hydrochloride, m.p. 189°–190° C., was prepared from 4-(3'-hydroxyphenyl)-4-methoxycarbonyl-piperidine hydrochloride and 1,2-dibromopropene-(2). The yield was 2.6 g. (68.5 percent of theory).

EXAMPLE 71

Using a procedure analogous to that described in example 5, 1-(2'-bromoallyl)-4-(3''-hydroxyphenyl)-4-ethoxycarbonyl-piperidine hydrochloride, m.p. 187° C., was prepared from 4-(3'-hydroxyphenyl)-4-ethoxycarbonyl-piperidine hydrochloride and 1,2-dibromopropene-(2). The yield was 2.9 g. (72 percent of theory).

EXAMPLE 72

Using a procedure analogous to that described in example 2, 1-(3',3'-dibromoallyl)-4-(3''-hydroxyphenyl)-4-acetyl-piperidine hydrochloride, m.p. 222° C., was prepared from 4-(3'-hydroxyphenyl)-4-acetyl-piperidine and 1,3,3-tribromopropene-(2). The yield was 4.0 g. (88 percent of theory).

EXAMPLE 73

Using a procedure analogous to that described in example 2, 1-(3', 3'-dibromoallyl)-4-(3''-hydroxyphenyl)-4-propionyl-piperidine hydrochloride, m.p. 233° C., was prepared from 4-(3'-hydroxyphenyl)-4-propionyl-piperidine and 1,3,3-tribromopropene-(2). The yield was 4.0 g. (85.5 percent of theory).

EXAMPLE 74

Using a procedure analogous to that described in example 5, 1-(3',3'-dibromoallyl)-4-(3''-hydroxyphenyl)-4-methoxycarbonyl-piperidine hydrochloride, m.p. 207° C., was prepared from 4-(3'-hydroxyphenyl)-4-methoxycarbonyl-piperidine hydrochloride and 1,3,3-tribromopropene-(2). The yield was 4.2 g. (89.5 percent of theory).

EXAMPLE 75

Using a procedure analogous to that described in example 5, 1-(3',3'-dibromoallyl)-4-(3''-hydroxyphenyl)-4-ethoxycarbonyl-piperidine hydrochloride, m.p. 219° C., was prepared from 4-(3'-hydroxyphenyl)-4-ethoxycarbonyl-piperidine hydrochloride and 1,3,3-tribromopropene-(2). The yield was 3.95 g. (81.5 percent of theory).

EXAMPLE 76

Preparation of 1-(3',3'-dimethylallyl)-4-(3''-chlorophenyl)-4-methoxycarbonyl-piperidine hydrochloride by method A 2.9 g. (0.01 mol) of 4-(3'-chlorophenyl)-4-methoxycarbonyl-piperidine hydrochloride were dissolved in 10 cc. of water, the solution was admixed with 10 cc. of 2 N sodium hydroxide, and the alkaline solution was extracted with ether. The ether phase was dried over magnesium sulfate and was then evaporated. The residue was dissolved in a mixture consisting of 30 cc. of tetrahydrofuran and 15 cc. of dimethylformamide, and to the resulting solution a mixture of 1.5 g. (0.01 mol) of 3,3-dimethylallyl-bromide and 1.3 g. (0.017 mol) of sodium bicarbonate was added. The mixture was refluxed for 9 hours, thereafter evaporated to dryness in an aspirator vacuum, the residue was stirred with a small amount of water to form a paste, and the paste was extracted with chloroform. The chloroform solution was dried over magnesium sulfate, evaporated to dryness, the residue was dissolved in methylene chloride which contained 2 percent of ethylacetate, and the resulting solution was filtered through 60 g. of basic aluminum oxide (activity I). The filtrate was evaporated, the residue was dissolved in 5 cc. of methanol, the solution was acidified with ethereal hydrochloric acid, and the acid solution was admixed with ether until it turned slightly cloudy, whereupon a crystalline precipitate formed which was separated and recrystallized from a mixture of methanol and ether. 3.2 g. (89 percent of theory) of a compound having a melting point of 201°–202° C. were obtained. It was identified to be 1-(3',3'-dimethylallyl)-4-(3''-chlorophenyl)-4-methoxycarbonyl-piperidine hydrochloride of the formula

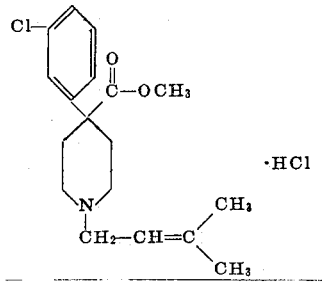

EXAMPLE 77

Using a procedure analogous to that described in example 76, 1-(3', 3'-dimethylallyl)-4-(2''-methylphenyl)-4-acetyl-piperidine hydrochloride, m.p. 175°–178° C., of the formula

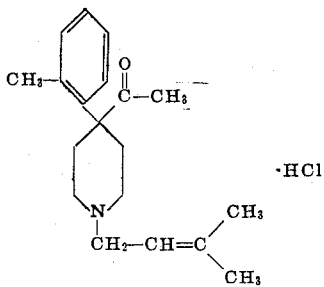

was prepared from 4-(2'-methylphenyl)-4-acetyl-piperidine hydrochloride and 3,3-dimethylallyl bromide. The yield was 2.2 g. (60 percent of theory).

EXAMPLE 78

Using a procedure analogous to that described in example 76, 1-(3',3'-dimethylallyl)-4-(2''-methylphenyl)-4-propionyl-piperidine hydrochloride, m.p. 186°–188° C., was prepared from 4-(2'-methylphenyl)-4-propionyl-piperidine hydrochloride and 3,3-dimethylallyl bromide. The yield was 2.6 g. (68 percent of theory).

EXAMPLE 79

Using a procedure analogous to that described in example 76,1-(3',3'-dimethylallyl)-4-(3''-methylphenyl)-4-acetyl-piperidine hydrochloride, m.p. 204°–205° C., was prepared from 4-(3'-methylphenyl)-4-acetyl-piperidine hydrochloride and 3,3-dimethylallyl bromide. The yield was 2.4 g. (75 percent of theory).

EXAMPLE 80

Using a procedure analogous to that described in example 76, 1-(3'-,3'-dimethylallyl)-4-(3''-methylphenyl)-4-propionyl-piperidine hydrochloride, m.p. 209°–212° C., was prepared from 4-(3'-methylphenyl)-4-propionyl-piperidine hydrochloride and 3,3-dimethylallyl bromide. The yield was 2.5 g. (74 percent of theory).

EXAMPLE 81

Using a procedure analogous to that described in example 76, 1-(3',3'-dimethylallyl)-4-(3''-methylphenyl)-4-methoxycarbonyl-piperidine hydrochloride, m.p. 205°–206° C., was prepared from 4-(3'-methylphenyl)-4-methoxycarbonyl-piperidine hydrochloride and 3,3-dimethylallyl bromide. The yield was 3.3 g. (98 percent of theory).

EXAMPLE 82

Using a procedure analogous to that described in example 76, 1-(3',3'-dimethylallyl)-4-(3''-methylphenyl)-4-ethoxycarbonyl-piperidine hydrochloride, m.p. 168°–169° C., was prepared from 4-(3'-methylphenyl)-4-ethoxycarbonyl-piperidine hydrochloride and 3,3-dimethylallyl bromide. The yield was 2.4 g. (68 percent of theory).

EXAMPLE 83

Using a procedure analogous to that described in example 76, 1-(3', 3'-dimethylallyl)-4-(4''-methylphenyl)-4-acetyl-piperidine hydrochloride, m.p. 209°–210° C. of the formula

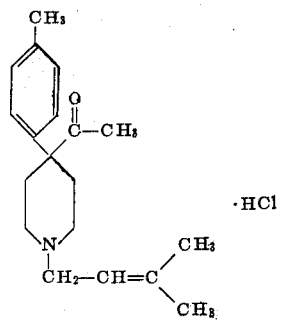

was prepared from 4-(4'-methylphenyl)-4-acetyl-piperidine hydrochloride and 3',3'-dimethylallyl bromide. The yield was 2.2 g. (77 percent of theory).

EXAMPLE 84

Using a procedure analogous to that described in example 76, 1-(3',3'-dimethylallyl)-4-(4''-methylphynyl)-4-propionyl-piperidine hydrochloride, m.p. 193°–194° C., was prepared from 4-(4'-methylphenyl)-4-propionyl-piperidine hydrochloride and 3,3-dimethylallyl bromide. The yield was 2.2 g. (74 percent of theory).

EXAMPLE 85

Using a procedure analogous to that described in example 76, 1-(3′,3′-dimethylallyl)-4-(4′′′-methylphenyl)-4-methoxycarbonyl-piperidine hydrochloride, m.p. 197°–198° C., was prepared from 4-(4′-methylphenyl)-4-methoxycarbonyl-piperidine hydrochloride and 3,3-dimethylallyl bromide. The yield was 3.0 g. (89 percent of theory).

EXAMPLE 86

Using a procedure analogous to that described in example 76, 1-(3′,3′-dimethylallyl)-4-(4′′-methylphenyl)-4-ethoxycarbonyl-piperidine hydrochloride, m.p. 200°–201° C., was prepared from 4-(4′-methylphenyl)-4-ethoxycarbonyl-piperidine hydrochloride and 3,3-dimethylallyl bromide. The yield was 2.2 g. (62 percent of theory).

EXAMPLE 87

Using a procedure analogous to that described in example 76, 1-(3′,3′-dimethylallyl)-4-(2′′-chlorophenyl)-4-acetyl-piperidine hydrochloride, m.p. 212°–213° C., of the formula

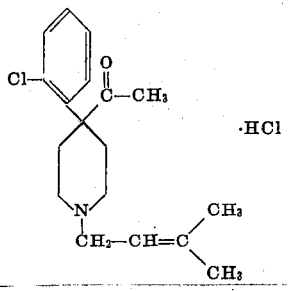

was prepared from 4-(2′-chlorophenyl)-4-acetyl-piperidine hydrochloride and 3,3-dimethylallyl bromide. The yield was 2.1 g. (54 percent of theory).

EXAMPLE 88

Using a procedure analogous to that described in example 76, 1-(3′,3′-dimethylallyl)-4-(2′′-chlorophenyl)-4-propionyl-piperidine hydrochloride, m.p. 163°–164° C., was prepared from 4-(2′-chlorophenyl)-4-propionyl-piperidine hydrochloride and 3,3-dimethylallyl bromide. The yield was 3.6 g. (90 percent of theory).

EXAMPLE 89

Using a procedure analogous to that described in example 76, 1-(3′,3′-dimethylallyl)-4-(3′′-chlorophenyl)-4-acetyl-piperidine hydrochloride, m.p. 219°–221° C., of the formula

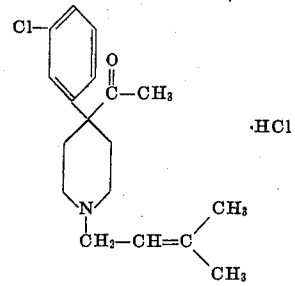

was prepared from 4-(3′-chlorophenyl)-4-acetyl-piperidine hydrochloride and 3,3-dimethylallyl bromide. The yield was 3.0 g. (88 percent of theory).

EXAMPLE 90

Using a procedure analogous to that described in example 76, 1-(3′,3′-dimethylallyl)-4(3′′-chlorophenyl)-4-propionyl-piperidine hydrochloride, m.p. 213°–215° C., was prepared from 4-(3′-chlorphenyl)-4-propionyl-piperidine hydrochloride and 3,3-dimethylallyl bromide. The yield was 3.5 g. (98 percent of theory).

EXAMPLE 91

Using a procedure analogous to that described in example 76, 1-(3′,3′-dimethylallyl)-4-(3′′-chlorophenyl)-4-ethoxycarbonyl-piperidine hydrochloride, m.p. 172°–175° C., was prepared from 4-(3′-chlorophenyl)-4-ethoxycarbonyl-piperidine hydrochloride and 3,3-dimethylallyl bromide. The yield was 3.7 g. (99 percent of theory).

EXAMPLE 92

Using a procedure analogous to that described in example 76, 1-(3′,3′-dimethylallyl)-4-(4′′-chlorophenyl)-4-acetyl-piperidine hydrochloride, m.p. 212°–214° C., of the formula

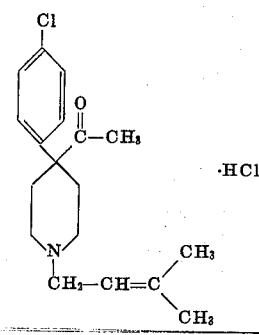

was prepared from 4-(4′-chlorophenyl)-4-acetyl-piperidine hydrochloride and 3,3-dimethylallyl bromide. The yield was 1.8 g. (59 percent of theory).

EXAMPLE 93

Using a procedure analogous to that described in example 76, 1-(3′,3′-dimethylallyl)-4-(4′′-chlorophenyl)-4-propionyl-piperdine hydrochloride, m.p. 205°–206° C., was prepared from 4-(4′-chlorophenyl)-4propionyl-piperdine hydrochloride and 3,3-dimethylallyl bromide. The yield was 3.3 g. (98 percent of theory).

EXAMPLE 94

Using a procedure analogous to that described in example 76, 1-(3′,3′-dimethylallyl)-4-(4′′-chlorophenyl)-4-methoxycarbonyl-piperidine hydrochloride, m.p. 214–216° C., was prepared from 4-(4′′-chlorophenyl)-4-methoxycarbonyl-piperidine hydrochloride and 3,3-dimethylallyl bromide. The yield was 2.3 g. (64 percent of theory).

EXAMPLE 95

Using a procedure analogous to that described in example 76, 1-(3′,3′-dimethylallyl)-4-(4′′-chlorophenyl)-4-ethoxycarbonyl-piperidine hydrochloride, m.p. 221°–222° C., was prepared from 4-(4′-chlorophenyl)-4-ethoxycarbonyl-piperidine hydrochloride and 3,3-dimethylallyl bromide. The yield was 2.8 g. (75 percent of theory).

EXAMPLE 96

Using a procedure analogous to that described in example 76, 1-(2′-methylallyl)-4-(2′′-methylphenyl)-4-acetyl-piperidine hydrochloride, m.p. 172°–174° C., of the formula

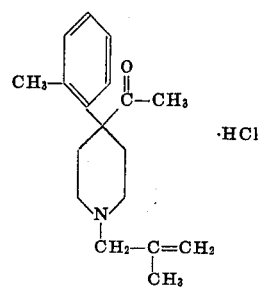

was prepared from 4-(2'-methylphenyl)-4-acetyl-piperidine hydrochloride and 2-methylallyl chloride. The yield was 2.9 g. (82 percent of theory).

EXAMPLE 97

Using a procedure analogous to that described in example 76, 1-(2'-methylallyl)-4-(2''-methylphenyl)-4-propionyl-piperidine hydrochloride, m.p. 194°–196° C., was prepared from 4-(2'-methylphenyl)-4-propionyl-piperidine hydrochloride and 2-methylallyl chloride. The yield was 2.0 g. (55 percent of theory).

EXAMPLE 98

Using a procedure analogous to that described in example 76, 1-(2'-methylallyl)-4)(3''-methylphenyl)-4-acetyl-piperidine hydrochloride, m.p. 199°–201° C., of the formula

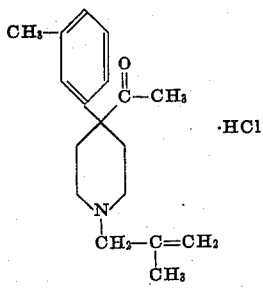

was prepared from 4-(3'-methylphenyl)-4-acetyl-piperidine hydrochloride and 2-methylallyl chloride. The yield was 3.2 g. (91 percent of theory).

EXAMPLE 99

Using a procedure analogous to that described in example 76, 1-(2'-methylallyl)-4-(3''-methylphenyl)-4-propionyl-piperidine hydrochloride, m.p. 200°–203° C., was prepared from 4-(3'-methylphenyl)-4-propionyl-piperidine hydrochloride and 2-methylallyl chloride. The yield was 1.2 g. (37.3 percent theory).

EXAMPLE 100

Using a procedure analogous to that described in example 76, 1-(2'-methylallyl)-4-(3''-methylphenyl)-4-methoxycarbonyl-piperidine hydrochloride, m.p. 230°–232° C., was prepared from 4-(3'-methylphenyl)-4-methoxycarbonyl-piperidine hydrochloride and 2-methylallyl chloride. The yield was 3.1 g. (84 percent of theory).

EXAMPLE 101

Using a procedure analogous to that described in example 76, 1-(2'-methylallyl)-4-(3''-methylphenyl)-4-ethoxycarbonyl-piperidine hydrochloride, m.p. 173°–174° C., was prepared from 4-(3'-methylphenyl)-4-ethoxycarbonyl-piperidine hydrochloride and 2-methylallyl chloride. The yield was 2.6 g. (77 percent of theory).

EXAMPLE 102

Using a procedure analogous to that described in example 76, 1-(2'-methylallyl)-4-(4''-methylphenyl)-4-acetyl-piperidine hydrochloride, m.p. 203°–204° C., of the formula

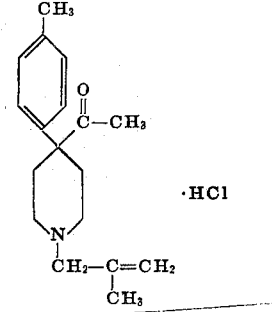

was prepared from 4-(4'-methylphenyl)-4-acetyl-piperidine hydrochloride and 2-methylallyl chloride. The yield was 2.7 g. (88 percent of theory).

EXAMPLE 103

Using a procedure analogous to that described in example 76, 1-(2'-methylallyl)-4-(4''-methylphenyl)-4-propionyl-piperidine hydrochloride, m.p. 220°–221° C., was prepared from 4-(4'-methylphenyl-4-propionyl-piperidine hydrochloride and 2-methylallyl chloride. The yield was 2.6 g. (71 percent of theory).

EXAMPLE 104

Using a procedure analogous to that described in example 76, 1-(2'-methylallyl)-4-(4''-methylphenyl)-4-methoxycarbonyl-piperidine hydrochloride, m.p. 219°–221° C., was prepared from 4-(4'-methylphenyl)-4-methoxycarbonyl-piperidine hydrochloride and 2-methylallyl chloride. The yield was 2.5 g. (68 percent of theory).

EXAMPLE 105

Using a procedure analogous to that described in example 76, 1-(2'-methylallyl)-4-(4''-methylphenyl)-4-ethoxy carbonyl-piperidine hydrochloride, m.p. 219°–221° C., was prepared from 4-(4'-methylphenyl)-4-ethoxycarbonyl-piperidine hydrochloride and 2-methylallyl chloride. The yield was 2.5 g. (66 percent of theory.).

EXAMPLE 106

Using a procedure analogous to that described in example 76, 1-(2'-methylallyl)-4-(3''-bromophenyl)-4-acetyl-piperidine hydrochloride, m.p. 221°–223° C., of the formula

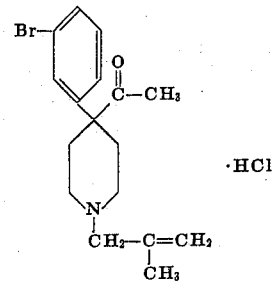

was prepared from 4-(3'-bromophenyl)-4-acetyl-piperidine hydrochloride and 2-methylallyl chloride. The yield was 2.9 g. (78 percent of theory).

EXAMPLE 107

Using a procedure analogous to that described in example 76, 1-(2'-methylally-4-(3''-bromophenyl)-4-methoxycarbonyl-piperidine hydrochloride, m.p. 213°–214° C., was prepared from 4-(3'-bromophenyl)-4-methoxycarbonyl-piperidine hydrochloride and 2-methylallyl chloride. The yield was 3.8 g. (98 percent of theory).

EXAMPLE 108

Using a procedure analogous to that described in example 76, 1-(2'-methylallyl)-4-(4''-bromophenyl)-4-methoxycarbonyl-piperidine hydrochloride, m.p. 217°–218° C., of the formula

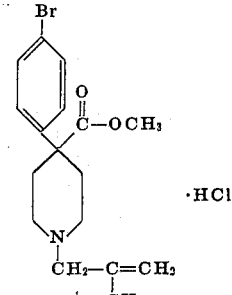

was prepared from 4-(4'-bromophenyl)-4-methoxycarbonyl-piperidine hydrochloride and 2-methylallyl chloride. The yield was 2.8 g. (72 percent theory).

EXAMPLE 109

Using a procedure analogous to that described in example 76, 1-(2'-methylallyl)-4-(2''-chlorophenyl)-4-acetyl-piperidine hydrochloride, m.p. 148°–150° C., of the formula

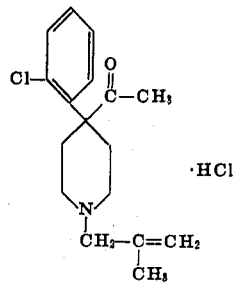

was prepared from 4-(2'-chlorophenyl)-4-acetyl-piperidine hydrochloride and 2-methylallyl chloride. The yield was 2.9 g. (75 percent of theory).

EXAMPLE 110

Using a procedure analogous to that described in example 76, 1-(2'-methylallyl)-4-(3''-chlorophenyl)-4-acetyl-piperidine hydrochloride, m.p. 226°–228° C., was prepared from 4-(3'-chlorophenyl)-4-acetyl-piperidine hydrochloride and 2-methylallyl chloride. The yield was 3.2 g. (98 percent of theory).

EXAMPLE 111

Using a procedure analogous to that described in example 76, 1-(2'-methylallyl)-4-(3''-chlorophenyl)-4-propionyl-piperidine hydrochloride, m.p. 215°–217° C., was prepared from 4-(3'-chlorophenyl)-4-propionyl-piperidine hydrochloride and 2-methylallyl chloride. The yield was 2.3 g. (67 percent of theory).

EXAMPLE 112

Using a procedure analogous to that described in example 76, 1-(2'methylallyl)-4-(3''-chlorophenyl)-4-methoxycarbon-yl-piperidine hydrochloride, m.p. 217°–218° C., was prepared from 4-(3'-chlorophenyl)-4-methoxycarbonyl-piperidine hydrochloride and 2-methylallyl chloride. The yield was 2.3 g. (67 percent of theory).

EXAMPLE 113

Using a procedure analogous to that described in example 76, 1-(2'-methylallyl)-4-(3''-chlorophenyl)-4-ethoxycarbon-yl-piperidine hydrochloride, m.p. 188°–189° C., was prepared from 4-(3'-chlorophenyl)-4-ethoxycarbonyl-piperidine hydrochloride and 2-methylallyl chloride. The yield was 2.5 g. (70 percent of theory).

EXAMPLE 114

Using a procedure analogous to that described in example 76, 1-(2'methylallyl)-4-(4''-chlorophenyl)-4-acetyl-piperidine hydrochloride, m.p. 212°–215° C., was prepared from 4-(4'-chlorophenyl)-4-acetyl-piperidine hydrochloride and 2-methylallyl chloride. The yield was 2.0 g. (61 percent of theory).

EXAMPLE 115

Using a procedure analogous to that described in example 76, 1-(2'-methylallyl)-4-(4''-chlorophenyl)-4- -propionyl-piperidine hydrochloride, m.p. 230°–231° C., was prepared from 4-(4'-chlorophenyl)-4-propionyl-piperidine hydrochloride and 2-methylallyl chloride. The yield was 2.9 g. (85 percent of theory).

EXAMPLE 116

Using a procedure analogous to that described in example 76, 1-(2'-methylallyl)-4-(4''-chlorophenyl)-4-methoxy-car-bonyl-piperidine hydrochloride, m.p. 217°–218° C., was prepared from 4-(4'-chlorophenyl)-4-methoxycarbonyl-piperidine hydrochloride and 2-methylallyl chloride. The yield was 2.4 g. (79 percent of theory).

EXAMPLE 117

Using a procedure analogous to that described in example 76, 1-(2'methylally)-4-(4''-chlorophenyl)-4-ethoxycarbonyl-piperidine hydrochloride, m.p. 221°–222° C., was prepared from 4-(4'-chlorophenyl)-4-ethoxycarbonyl-piperidine hydrochloride and 2-methylallyl chloride. The yield was 2.6 g. (73 percent of theory).

EXAMPLE 118

Using a procedure analogous to that described in example 76, 1-(2'-methylallyl)-4-(3''fluorophenyl)-4-methoxycarbon-yl-piperidine hydrochloride, m.p. 215°–216° C., of the formula

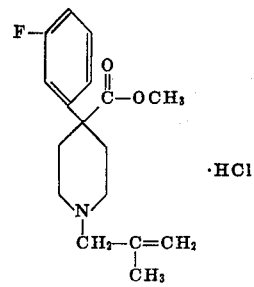

was prepared from 4-(3'-fluorophenyl)-4-methoxycarbonyl-piperidine hydrochloride and 2-methylallyl chloride. The yield was 2.0 g. (61 percent of theory).

EXAMPLE 119

Using a procedure analogous to that described in example 76, 1-(1'-methylally)-4-(3''-methylphenyl)-4methoxycarbon-yl-piperidine hydrochloride, m.p. 209°–211°C., of the formula

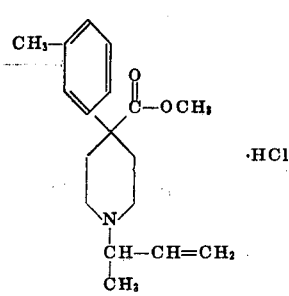

was prepared from 4-(3'-methylphenyl)-4-methoxycarbonyl-piperidine hydrochloride and 1-methylallyl chloride. The yield was 2.0 g. (60 percent of theory).

EXAMPLE 120

Using a procedure analogous to that described in example 76, 1-(1'-methylallyl)-4-(3''-methylphenyl)-4-ethoxycarbonyl-piperidine hydrochloride, m.p. 165°–167° C., was prepared from 4-(3'-methylphenyl)-4-ethoxycarbonyl-piperidine hydrochloride and 1-methylallyl chloride. The yield was 1.5 g. (42 percent of theory).

EXAMPLE 121

Using a procedure analogous to that described in example 76, 1-(3',3'-dimethylallyl)-4-(3''-fluorophenyl)-4-methoxycarbonyl-piperidine hydrobromide, m.p. 223°–224° C., of the formula

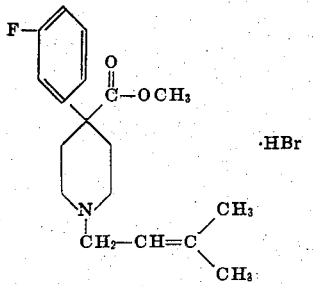

was prepared from 4-(3'-fluorophenyl)-4-methoxycarbonyl-piperidine hydrochloride and 3,3-dimethylallyl bromide. The yield was 2.8 g. (73 percent of theory).

EXAMPLE 122

Using a procedure analogous to that described in example 76, 1-(3',3'-dimethylallyl)-4-(3''-fluorophenyl)-4-ethoxycarbonyl-piperidine hydrobromide, m.p. 205°–206° C., was prepared from 4-(3'-fluorophenyl)-4-ethoxycarbonyl-piperidine hydrochloride and 3,3-dimethylallyl bromide. The yield was 3.7 g. (92 percent of theory).

EXAMPLE 123

Using a procedure analogous to that described in example 76, 1-crotyl-4-(3'-methylphenyl)-4-methoxycarbonyl-piperidine hydrobromide, m.p. 210°–212° C., of the formula

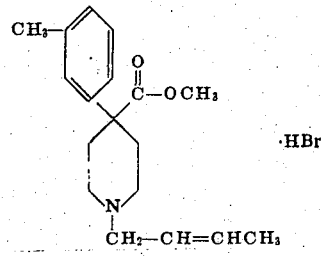

was prepared from 4-(3'-methylphenyl)-4-methoxycarbonyl-piperidine hydrochloride and γ-methallyl bromide (1-bromo-2-butene). The yield was 2.2 g. (60 percent of theory).

EXAMPLE 124

Using a procedure analogous to that described in example 76, 1-crotyl-4-(3'-methoxyphenyl)-4-ethoxycarbonyl-piperidine hydrobromide, m.p. 172°–175° C., of the formula

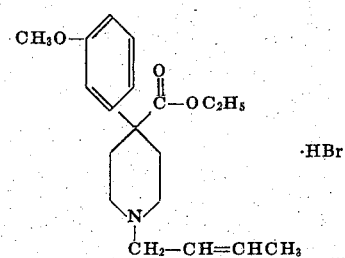

was prepared from 4-(3'-methoxyphenyl)-4-ethoxycarbonyl-piperidine hydrochloride and γ-methallyl bromide. The yield was 1.6 g. (42 percent of theory).

EXAMPLE 125

Using a procedure analogous to that described in example 76, 1-crotyl-4-(3'-fluorophenyl)-4-methoxycarbonyl-piperidine hydrobromide, m.p. 212°–214° C., of the formula

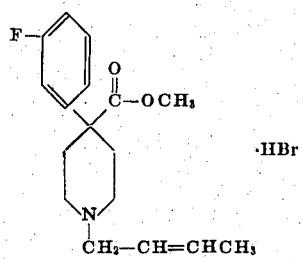

was prepared from 4-(3'-fluorophenyl)-4-methoxycarbonyl-piperidine hydrochloride and γ-methallyl bromide. The yield was 2.1 g. (56 percent of theory).

EXAMPLE 126

Using a procedure analogous to that described in example 76, 1-crotyl-4-(3'-chlorophenyl)-4-acetyl-piperidine hydrobromide, m.p. 198°–200° C., was prepared from 4-(3'-chlorophenyl)-4-acetyl piperidine hydrochloride and γ-methallyl bromide. The yield was 2.2 g. (59 percent of theory).

EXAMPLE 127

Using a procedure analogous to that described in example 76, 1-crotyl-4-(3'-chlorophenyl)-4-methoxycarbonyl-piperidine hydrobromide, m.p. 211°–213° C., was prepared from 4-(3'-chlorophenyl)-4-methoxycarbonyl-piperidine hydrochloride and γ-methallyl bromide. The yield was 2.2 g. (57 percent of theory).

EXAMPLE 128

Using a procedure analogous to that described in example 76, 1-crotyl-4-(3'chlorophenyl)-4-ethoxycarbonyl-piperidine 4hydrobromide, m.p. 172°–175° C., was prepared from 4-(3'-chlorophenyl)-4-ethoxycarbonyl-piperidine hydrochloride and γ-methallyl bromide. The yield was 2.1 g. (52 percent of theory).

EXAMPLE 129

Using a procedure analogous to that described in example 76, 1-crotyl-4-(4'-chlorophenyl)-4-ethoxycarbonyl-piperidine hydrobromide, m.p. 200°–202° C., was prepared from 4-(4'-chlorophenyl)-4-ethoxycarbonyl-piperidine hydrochloride and γ-methallyl bromide. The yield was 2.2 g. (55 percent of theory).

EXAMPLE 130

Using a procedure analogous to that described in example 76, 1-(1'-methylallyl)-4-(4''-chlorophenyl)-4-ethoxycarbonyl-piperidine hydrochloride, m.p. 199°–200° C., was prepared from 4-(4'-chlorophenyl)-4-ethoxycarbonyl-piperidine hydrochloride and 3-chlorobutene-(1). The yield was 0.9 g. (25 percent of theory).

EXAMPLE 131

Preparation of 1-(3', 3'-dimethylallyl)-4-(3''-hydroxyphenyl)-4-acetyl-piperidine hydrochloride by method A 2.18 g. (0.01 mol) of 4-(3'-hydroxyphenyl-4-acetyl-piperidine, 1.26 g. (0.015 mol) of sodium bicarbonate, 1.64 g. of 3,3-diemthylallyl bromide, 10 cc. of dimethyl formamide and 25 cc. of tetrahydrofuran were admixed with each other, and the mixture was refluxed for 2 hours. Thereafter, the solvent medium was evaporated in vacuo, and the residue was rinsed with 50 cc. of chloroform into a separating funnel. The chloroform solution was extracted three times with 20 cc. portions of water, dried over sodium sulfate, and evaporated in vacuo. The residue was taken up in methanol, the resulting solution was acidified with 4 cc. of 2.5 N ethanolic hydrochloric acid, and the acid solution was admixed with ether until it turned cloudy. Upon scratching, a crystalline precipitate separated out. The precipitate was separated by vacuum filtration the following morning, washed with water and dried. 1.3 g. (40 percent of theory) of a compound having a melting point of 195° C., were obtained. It was identified to be 1-(3',3'-dimethylallyl)-4-(3''-hydroxyphenyl)-4-acetyl-piperidine hydrochloride of the formula

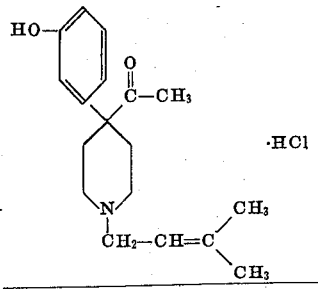

EXAMPLE 132

Preparation of 1-(3',3'-dimethylallyl)-4-(3''-hydroxyphenyl)-4-ethoxycarbonyl-piperidine hydrochloride by method A 2.86 g. (0.01 mol) of 4-(3'-hydroxyphenyl)-4-ethoxycarbonyl-piperidine hydrochloride, 2.10 g. (0.025 mol) of sodium bicarbonate, 1.64 g. (0.011 mol) of 3,3-dimethylallyl bromide, 10 cc. of dimethylformamide and 25 cc. of tetrahydrofuran were admixed with each other, and the mixture was refluxed for 2 hours. Thereafter, the reaction mixture was worked up as described in example 131. 1.9 g. (53.5 percent of theory) of a crystalline compound having a melting point of 222° C., were obtained. It was identified to be 1-(3',3'-dimethylallyl)-4-(3''-hydroxyphenyl)-4-ethoxycarbonyl-piperidine hydrochloride of the formula

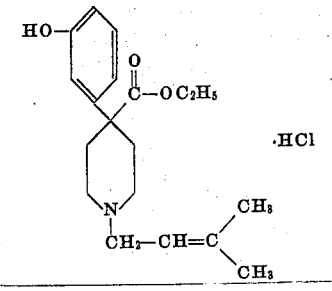

EXAMPLE 133

Using a procedure analogous to that described in example 131, 1-(3',3'-dimethylallyl)-4-(3''-hydroxyphenyl)-4-propionyl-piperidine hydrochloride, m.p. 217° C., was prepared from 4-(3'-hydroxyphenyl)-4-propionyl-piperidine and 3,3-dimethylallyl bromide. The yield was 1.7 g. (50.5 percent of theory).

EXAMPLE 134

Using a procedure analogous to that described in example 131, 1-(3',3'-dimethylallyl)-4-(3''-hydroxyphenyl)-4-butyryl-piperidine hydrochloride, m.p. 235° C., was prepared from 4-(3'-hydroxyphenyl)-4-butyryl-piperidine hydrochloride and 3,3-dimethylallyl bromide. The yield was 2.0 g. (57 percent of theory).

EXAMPLE 135

Using a procedure analogous to that described in example 132, 1-(3',3'-dimethylallyl)-4-(3''-hydroxyphenyl)-4-methoxycarbonyl-piperidine hydrochloride, m.p. 205° C., was prepared from 4-(3'-hydroxyphenyl)-4-methoxycarbonyl-piperidine hydrochloride and 3,3-dimethylallyl bromide. The yield was 1.5 g. (44 percent of theory).

EXAMPLE 136

Using a procedure analogous to that described in example 132, 1-(3',3'-dimethylallyl)-4-(3''-hydroxyphenyl)-4-propoxycarbonyl-piperidine hydrochloride, m.p. 214° C., was prepared from 4-(3'-hydroxyphenyl)-4-propoxycarbonyl-piperidine hydrochloride and 3,3-dimethylallyl bromide. The yield was 1.7 g. (47.5 percent of theory).

EXAMPLE 137

Using a procedure analogous to that described in example 132, 1-(3',3'-dimethylallyl)-4-(3''-methoxyphenyl)-4-propionyl-piperidine hydrochloride, m.p. 165° C., of the formula

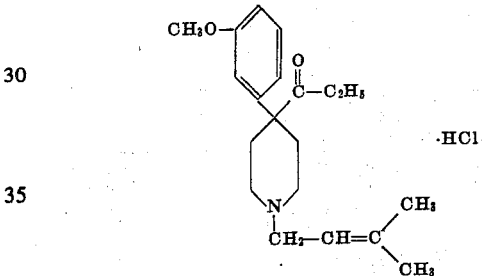

was prepared from 4-(3'-methoxyphenyl)-4-propionyl-piperidine and 3,3-dimethylallyl bromide. The yield was 1.8 g. (51 percent of theory).

EXAMPLE 138

Using a procedure analogous to that described in example 132, 1-(3',3'-dimethylallyl)-4-(3''-methoxyphenyl)-4-ethoxycarbonyl-piperidine hydrochloride, m.p. 171° C., was prepared from 4-(3'-methoxyphenyl)-4-ethoxycarbonyl-piperidine hydrochloride and 3,3-dimethylallyl bromide. The yield was 2.0 g. (54.5 percent of theory).

EXAMPLE 139

Using a procedure analogous to that described in example 132, 1-(3',3'-dimethylallyl)-4-(2''-hydroxyphenyl)-4-methoxycarbonyl-piperidine hydrochloride, m.p. 230° C., was prepared from 4-(2'-hydroxyphenyl)-4-methoxycarbonyl-piperidine hydrochloride and 3,3-dimethylallyl bromide. The yield was 2.0 g. (59 percent of theory).

EXAMPLE 140

Using a procedure analogous to that described in example 132, 1-(3',3'-dimethylallyl)-3α4-(4''-hydroxyphenyl)-4-methoxycarbonyl-piperidine hydrochloride, m.p. 198° C., was prepared from 4-(4'-hydroxyphenyl)-4-methoxycarbonyl-piperidine hydrochloride and 3,3-dimethylallyl bromide. The yield was 1.44 g. (42 percent of theory).

EXAMPLE 141

Using a procedure analogous to that described in example 131, 1-(3',3'-dimethylallyl)-3α-methyl-4-(3''-hydroxyphenyl)-4-propionyl-piperidine hydrochloride, m.p. 83° C., of the formula

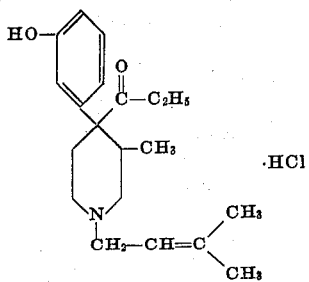

was prepared from 3α-methyl-4-(3'-hydroxyphenyl)-4-propionyl-piperidine and 3,3-dimethylallyl bromide. The yield was 1.8 g. (51 percent of theory).

EXAMPLE 142

Using a procedure analogous to that described in example 132, 1-(3',3'-dimethylallyl)-3α-methyl-4-(3'-hydroxyphenyl)-4-methoxycarbonyl-piperidine hydrochloride, m.p. 142° C., was prepared from 3α-methyl-4-(3'-hydroxyphenyl)-4-methyoxycarbonyl-piperidine hydrochloride and 3,3-dimethylallyl bromide. The yield was 1.9 g. (53.5 percent of theory).

EXAMPLE 143

Using a procedure analogous to that described in example 132, 1-crotyl-4-(3'-hydroxyphenyl)-4-methoxycarbonyl-piperidine hydrochloride, m.p. 213° C., was prepared from 4-(3'-hydroxyphenyl)-4-methoxycarbonyl-piperidine hydrochloride and γ-methallyl bromide (reflux time: 3 hours). The yield was 1.7 g. (53.5 percent of theory).

EXAMPLE 144

Using a procedure analogous to that described in example 132, 1-crotyl-4-(3'-hydroxyphenyl)-4-ethoxycarbonyl-piperidine hydrochloride, m.p. 216° C., was prepared from 4-(3'-hydroxyphenyl)-4-ethoxycarbonyl-piperidine hydrochloride and γ-methallyl bromide (reflux time: 4 hours). The yield was 2.2 g. (64.5 percent of theory).

EXAMPLE 145

Using a procedure analogous to that described in example 132, 1-crotyl-4-(3'-hydroxyphenyl)-4-propoxycarbonyl-piperidine hydrochloride, m.p. 210° C., was prepared from 4-(3'-hydroxyphenyl)-4-propoxycarbonyl-piperidine hydrochloride and γ-methallyl bromide (reflux time: 3 hours). The yield was 2.5 g. (70.5 percent of theory).

EXAMPLE 146

Using a procedure analogous to that described in example 132, 1-(2'-methylallyl)4-(3''-hydroxyphenyl)-4-methoxycarbonyl-piperidine hydrochloride, m.p. 185° C., was prepared from 4-(3'-hydroxyphenyl)-4-methoxycarbonyl-piperidine hydrochloride and β-methallyl chloride (reflux time: 3 hours). The yield was 2.2 g. (67.5 percent of theory).

EXAMPLE 147

Using a procedure analogous to that described in example 132, 1-(2'-methylallyl)-4-(3''-hydroxyphenyl)-4-ethoxycarbonyl-piperidine hydrochloride, m.p. 173° C., was prepared from 4-(3'-hydroxyphenyl)-4-ethoxycarbonyl-piperidine hydrochloride and β-methallyl chloride (reflux time: 3 hours). The yield was 2.7 g. (79.5 percent of theory).

EXAMPLE 148

Using a procedure analogous to that described in example 132, 1-(2'-methylallyl)-4-(3''-hydroxyphenyl)-4-propoxycarbonyl-piperidine hydrochloride, m.p. 150° C., was prepared from 4-(3'-hydroxyphenyl)-4-propoxycarbonyl-piperidine hydrochloride and β-methallyl chloride (reflux time: 3 hours). The yield was 2.6 g. (73.5 percent of theory).

EXAMPLE 149

Using a procedure analogous to that described in example 131, 1-crotyl-4-(3'-hydroxyphenyl)-4-acetyl-piperidine hydrochloride, m.p. 162° C., was prepared from 4-(3'-hydroxyphenyl)-4-acetyl-piperidine and γ-methallyl bromide (reflux time: 3 hours). The yield was 1.1 g. (35.5 percent of theory).

EXAMPLE 150

Using a procedure analogous to that described in example 131, 1-crotyl-4-(3'-hydroxyphenyl)-4-propionyl-piperidine hydrochloride, m.p. 209° C., was prepared from 4-(3'-hydroxyphenyl)-4-propionyl-piperidine and γ-methallyl bromide (reflux time: 3 hours). The yield was 2.2 g. (68 percent of theory).

EXAMPLE 151

Using a procedure analogous to that described in example 131, 1-crotyl-4-(3'-hydroxyphenyl)-4-butyryl-piperidine hydrochloride, m.p. 215.5° C., was prepared from 4-(3'-hydroxyphenyl)-4-butyryl-piperidine and γ-methallyl bromide (reflux time: 3 hours). The yield was 1.75 g. (52 percent of theory).

EXAMPLE 152

Using a procedure analogous to that described in example 131, 1-(2'-methylallyl)-4-(3''-hydroxyphenyl)-4-acetyl-piperidine hydrochloride, m.p. 120° C., was prepared from 4-(3'-hydroxyphenyl)-4-acetyl-piperidine and β-methallyl chloride (reflux time: 3 hours). The yield was 2.2 g. (71 percent of theory).

EXAMPLE 153

Using a procedure analogous to that described in example 131, 1-(2'-methylallyl)-4-(3''-hydroxyphenyl)-4-propionyl-piperidine hydrochloride, m.p. 177° C., was prepared from 4-(3'-hydroxyphenyl)-4-propionyl-piperidine and β-methallyl chloride (reflux time: 3 hours). The yield was 1.7 g. (52.5 percent of theory).

EXAMPLE 154

Using a procedure analogous to that described in example 131, 1-(2'-methylallyl)-4-(3''-hydroxyphenyl)-4-butyryl-piperidine, m.p. 192° C., was prepared from 4-(3'-hydroxyphenyl)-4-butyryl-piperidine and β-methallyl chloride (reflux time: 3 hours). The yield was 1.7 g. (50 percent of theory).

EXAMPLE 155

Using a procedure analogous to that described in example 132, 1-crotyl-4-(2''-hydroxyphenyl)-4-ethoxycarbonyl-piperidine hydrochloride, m.p. 222° C., was prepared from 4-(2'-hydroxyphenyl)-4-ethoxycarbonyl-piperidine hydrochloride and β-methallyl chloride (reflux time: 3 hours). The yield was 1.4 g. (41 percent of theory).

EXAMPLE 156

Using a procedure analogous to that described in example 132, 1-(2'-methylallyl)-4-(2''-hydroxyphenyl)-4-ethoxycarbonyl-piperidine hydrochloride, m.p. 248° C., was prepared from 4-(2'-hydroxyphenyl)-4-ethoxycarbonyl-piperidine hydrochloride and β-methallyl chloride (reflux time: 3 hours). The yield was 2.8 g. (82.5 percent of theory).

EXAMPLE 157

Using a procedure analogous to that described in example 132, 1-crotyl-4-(4'-hydroxyphenyl)-4-ethoxycarbonyl-piperidine hydrochloride, m.p. 180.5° C., was prepared from 4-(4'-hydroxyphenyl)-4-ethoxycarbonyl-piperidine hydrochloride and γ-methallyl bromide (reflux time: 3 hours). The yield was 2.85 g. (84 percent of theory).

EXAMPLE 158

Using a procedure analogous to that described in example 132, 1-(2'-methylallyl)-4-(4''-hydroxyphenyl)-4-ethoxycarbonyl-piperidine hydrochloride, m.p. 212° C., was prepared from 4-(4'-hydroxyphenyl)-4-ethoxycarbonyl-piperidine hydrochloride and β-methallyl chloride (reflux time: 3 hours). The yield was 1.6 g. (47 percent of theory).

EXAMPLE 159

Using a procedure analogous to that described in example 131, 1-(1'-methylallyl)-4-(3''-hydroxyphenyl)-4-propionyl-piperidine hydrochloride, m.p. 210° C., was prepared from 4-(3'-hydroxyphenyl)-4-propionyl-piperidine and α-methallyl chloride (reflux time: 15 hours). The yield was 1.75 g. (54 percent of theory).

EXAMPLE 160

Using a procedure analogous to that described in example 132, 1-(1'-methylallyl)-4-(3''-hydroxyphenyl)-4-methoxycarbonyl-piperidine hydrochloride, m.p. 199° C., was prepared from 4-(3'-hydroxyphenyl)-4-methoxycarbonyl-piperidine hydrochloride and α-methallyl chloride (reflux time: 15 hours). The yield was 2.5 g. (77 percent of theory).

EXAMPLE 161

Using a procedure analogous to that described in example 132, 1-(1'-methylallyl)-4-(2''-hydroxyphenyl)-4-ethoxycarbonyl-piperidine hydrochloride, m.p. 226° C., was prepared from 4-(2'-hydroxyphenyl)-4-ethoxycarbonyl-piperidine hydrochloride and α-methallyl chloride (reflux time: 15 hours). The yield was 1.9 g. (56 percent of theory).

EXAMPLE 162

Preparation of trans-1-(3'-chloroallyl)-4-(3''-hydroxyphenyl)-4-methoxycarbonyl-piperidine hydrochloride by method B.

a. Trans-1-(3'-chloroallyl)-4-(3''-methoxyphenyl)-4-cyano-piperidine hydrochloride 67.0 g. (0.256 mol) of trans-N-(3'-chloroallyl)-bis-(2''-chloroethyl)-amine hydrochloride were dissolved in water, and the resulting solution was made alkaline with concentrated sodium hydroxide in the presence of ice, whereby the free base precipitated out. The alkaline mixture was then saturated with potassium carbonate and was extracted three times with 75 cc. portions of toluene. The combined toluene extract solutions were dried with potassium carbonate, and then the toluene was distilled off at about 40°–50° C. The residue was dissolved in 160 cc. of absolute toluene, and the resulting solution was admixed with 37.7 g. (0.256mol) of 3-methoxybenzyl-cyanide. To the resulting mixture 21.2 g. (0.545 mol) of sodium amide were added in small portions over a period of 20 minutes while stirring and cooling with ice to maintain a temperature of 30°–40° C. Thereafter, the reaction mixture was refluxed for 1 hour. Subsequently, the reaction solution was allowed to cool, admixed with 100 cc. of water, and the toluene phase was separated. The toluene solution was shaken with 200 cc. of 2 N HCl and 1,000 cc. of water until two clear liquid phases had formed, and the phases were separated. The aqueous phase was extracted first with toluene and then with ether, and was then made strongly alkaline with concentrated ammonia. The precipitate formed thereby, namely, the free base trans-1-(3'-chloroallyl)-4-(3''-methoxyphenyl)-4-cyano-piperidine, was separated by extracting the mixture three times with 200 cc., portions of ether, and the combined extract solutions were dried with sodium sulfate and then acidified with ethanolic hydrochloric acid. The precipitate formed thereby was separated and washed with ether. Fifty-six grams (67 percent of theory) of the hydrochloride of the above free base were obtained. It had a melting point of 187° C.

b. Trans-1-(3'-chloroallyl)-4-(3''-hydroxyphenyl)-4-carboxy-piperidine

A mixture of 25 g. (0.074 mol) of trans-1-(3'-chloroallyl)-4-(3''-methoxyphenyl)-4-cyano-piperidine hydrochloride, 42 g. of phenol and 190 cc. of aqueous 48 percent hydrobromic acid was refluxed for 4 hours. Thereafter, the reaction solution was allowed to cool, was then diluted with 190 cc. of water, and was extracted twice with 100 cc. portions of ether. The combined ether extract solutions were washed with 50 cc. of water, the combined acid aqueous wash solutions were extracted once with 100 cc. of ether and then evaporated to dryness. The residue was recrystallized from water, yielding 18 g. (64.5 percent of theory) of the pure hydrobromide of trans-1-(3'-chloroally)-4-(3''-hydroxyphenyl-4-carboxy-piperidine having melting points of 130° C. and 222° C. A small sample of the product, recrystallized from a mixture of ethanol an ethanol and ether, had a melting point of 222° C.

The hydrobromide was dissolved in 225 cc. of water, and the solution was neutralized (pH 7) with concentrated ammonia, whereby the free base was liberated. It had a melting point of 273° C.

c. Trans-1-(3'-chloroallyl)-4-(3''-hydroxyphenyl)-4-methoxycarbonyl-piperidine hydrochloride 5.1 g. (0.0172 mol) of trans-1-(3'-chloroallyl)-4-(3''-hydroxyphenyl)-4-carboxy-piperidine were suspended in 50 cc. of absolute ethanol. The suspension was then placed on a boiling water bath and was saturated with dry hydrogen chloride gas. The suspended matter went into solution and later a precipitate formed. After boiling the mixture in this manner for 3 hours while passing hydrogen chloride therethrough, it was allowed to cool and the precipitate was separated by vacuum filtration. The crystalline filter cake was washed with a mixture of methanol and ether. 4.1 g. (83.5 percent of theory) of trans-1-(3'-chloroallyl)-4-(3'-chloroallyl)-4-(3''-hydroxyphenyl)-4-methoxycarbonyl-piperidine hydrochloride, m.p. 217° C., were obtained.

The free base, obtained by neutralizing a solution of the hydrochloride with ammonia, had a melting point of 141° C.

EXAMPLE 163

Preparation of trans-1-(3'-chloroally)-4-(3''-hydroxyphenyl)-4-acetyl-piperidine hydrochloride 25.0 g. (0.074 mol) of trans-1-(3'-chloroallyl)-4-(3''-methoxyphenyl)-4-cyano-piperidine hydrochloride, i.e., the product of example 162 (a), were shaken with a mixture of 100cc. water, 37 cc. 2 N sodium hydroxide and 75 cc. benzene, the benzene phase was separated, and the aqueous phase was extracted twice with 75 cc. portions of benzene. The benzene solutions were combined, dried with sodium sulfate, and the benzene was evaporated in vacuo. The residue was dissolved in absolute benzene, the solution was again evaporated to dryness, the residue was again dissolved in absolute benzene, and the resulting solution was added dropwise to a Grignard reagent consisting of a solution of methyl magnesium iodide in benzene at 40° C. Thereafter, benzene was distilled out of the reaction mixture, while stirring, until the internal temperature rose to 76° C., and then the mixture was stirred at that temperature for 16 hours. Subsequently, the reaction mixture was poured into a mixture of 200 g. ice and 50 g. ammonium chloride, heated to 30° C., and extracted three times with 200cc. portions of benzene. The combined benzene extract solutions were dried, and the benzene was evaporated. The residue was the 4-ketimine analog of the starting material, which was used without further purification in the subsequent reaction steps as follows:

50 grams of phenol and 220 cc. of aqueous 48 percent hydrobromic acid were added to the ketimine, and the mixture was refluxed for four hours, allowed to cool, diluted with 220 cc. of water and extracted twice with 100 cc. portions of ether. The ether extract solution was washed with 50 cc. of water, the wash solution and the extracted aqueous reaction solution were combined, again extracted with 100 cc. of ether and finally evaporated to dryness. The residue was dissolved in ethanol, and the solution was acidified with ethanolic hydrochloric acid, whereby a crystalline precipitate was formed. The precipitate was recrystallized from a mixture of ethanol and ether, yielding 7.4 g. (30.5 percent of theory) of trans-1-(3'-chloroallyl)-4-(3''-hydroxyphenyl)-4-acetyl-piperidine hydrochloride, m.p. 184° C.

The trans-N-(3'-chloroallyl)-bis-(2''-chloroethyl)-amine hydrochloride used as a starting compound in example 162 was itself prepared in the following manner:

EXAMPLE 164 a. Trans-N-(3-chloroallyl)-diethanolamine 36.8 g. (0.35 mol) of diethanolamine, 42.5 g. (0.385 mol) of trans-1,3-dichloropropene-(2) and 44 g. (0.525 mol) of sodium bicarbonate were admixed with 43 cc. of dimethylformamide and 107 cc. of tetrahydrofuran, and the mixture was refluxed for 3 hours. Thereafter, the reaction solution was evaporated and the residue was shaken with a mixture of 100 cc. water and 75 cc. chloroform. The aqueous and organic phases were separated in a separating funnel, the aqueous phase was again extracted several times with 50 cc. portions of chloroform, the chloroform solutions were combined, dried over sodium sulfate, the solvent was distilled off, and the oily residue was distilled in vacuo. After a preliminary fraction of 6 g., 55.5 g. (88 percent of theory) of trans-N-(3-chloroallyl)-diethanolamine, b.p. 134°-136° C., at 0.4 mm. Hg, were obtained.

b. Trans-N-(3-chloroallyl)-bis-(2-dichloroethyl)-amine hydrochloride 46.0 g. (0.256 mol) of trans-N-(3-chloroallyl)-diethanolamine were dissolved in 50 cc. of absolute chloroform, and the resulting solution was admixed over a period of thirty minutes with a solution of 130 g. of thionylchloride (1.1 mol) in 100 cc. of chloroform, accompanied by stirring and cooling with ice. Thereafter, the reaction mixture was refluxed for 1 hour, cooled and admixed with 300 cc. of absolute ether. The mixture was allowed to stand in a refrigerator, whereupon a crystalline precipitate separated out. The precipitate was separated, washed with ether, dried in vacuo and recrystallized from a mixture of ethanol and ether. 64 gram (100 percent of theory) of trans-N-(3'-chloroallyl)-bis-(2''-chloroethyl)-amine hydrochloride, m.p. 62° C., were obtained.

The compounds according to the present invention, that is, those embraced by formula I above and their nontoxic, pharmacologically acceptable acid addition salts, have useful pharmacodynamic properties. More particularly, they exhibit analgesic as well as morphine-antagonistic properties in warm-blooded animals. In other words, they are very effective analgesics free from physical dependence capacity.

The morphine-antagonistic activities of the compounds of the present invention were ascertained by standard pharmacological tests on laboratory mice, as well as by tests on morphine-addicted monkeys.

For determination of the morphine-antagonistic activity in mice, 15 mg./kg. of morphine, i.e., the median effective analgesic dose ($ED_{50}$) which causes 50 percent of the test animals to show analgesic response in the test method of Haffner, Deutsche Medizinische Wochenschrift 55, 751–733 (1929), for determination of analgesic activity, were subsutaneously injected into adult laboratory mice. Thereafter, the test compound under investigation for morphine-antagonistic activity was also injected subcutaneously at various dosage levels, and the dose range was determined which produces discernable to complete suppression of the morphine-induced analgesia. Ten mice were used for each dose of each of the compounds under investigation; the following illustrative results were obtained:

A = 1-(3''-Dimethylallyl)-4-(3''-hydroxyphenyl)-Q4-ethoxycarbonyl-piperidine hydrochloride(example 132);

B= 1-(3',3'-Dimethylallyl)-4-(3''-methylphenyl)-4-ethoxycarbonyl-piperidine hydrochloride (example 83);

C = 1-(3',3'-Dimethylallyl)-4-(3''-chlorophenyl)-4-methoxycarbonyl-piperidine hydrochloride (example 77);

D= 1-(3',3'-Dimethylallyl)-4-(3''-methylphenyl)-4-propionyl-piperidine hydrochloride (example 81); and E = 1-(3',3'-Diemthylallyl)-4-phenyl-4propionlyl-piperidine hydrochloride.

| Injection | Percentage of test animals showing analgesic response |
|---|---|
| 15 mg./kg. morphine alone | 50 |
| 15 mg./kg. morphine +3 mg./kg. A | 50 |
| 15 mg./kg. morphine +10 mg./kg. A | 40 |
| 15 mg./kg. morphine +30 mg./kg. A | 0 |
| 15 mg./kg. morphine +0.1 mg./kg. B | 50 |
| 15 mg./kg. morphine +0.3 mg./kg. B | 30 |
| 15 mg./kg. morphine +1.0 mg./kg. B | 20 |
| 15 mg./kg. morphine +3.0 mg./kg. B | 20 |
| 15mg./kg. morphine +10 mg./kg. B | 10 |
| 15 mg./kg. morphine +30 mg./kg. B | 0 |
| 15mg./kg. morphine +0.03 mg./kg. C | 10 |
| 15 mg./kg. morphine +0.1 mg./kg. C | 0 |
| 15 mg./kg. morphine +1.0 mg./kg. C | 0 |
| 15 mg./kg. morphine +0.03 mg./kg. D | 50 |
| 15 mg./kg. morphine +0.1 mg./kg. D | 30 |
| 15mg./kg. morphine +0.3 mg./kg. D | 20 |
| 15 mg./kg. morphine +1.0 mg./kg. D | 15 |
| 15 mg./kg. morphine +100 mg./kg. E | 70 |

These results clearly show that the compounds of the instant invention (A–D) are effective morphine antagonists, whereas the analogous compound with an unsubstituted 4-phenyl moiety instead potentiates the morphine analgesia and therefore is not a morphine antagonist.

Tests on morphine-addicted monkeys have shown that the compounds of the present invention, namely 1-(3',3'-dimethylallyl)-4-(3''-methylphenyl)-4-ethylcarbonyl-piperidine hydrochloride (NIH 8233), 1-(3',3'-diemthylallyl)-4-(3''-hydroxyphenyl)-4-ethylcarbonyl-pipiperidine methanesulfonate (NIH 8235) and 1-(340,3'-dimethylally)-4-(3''-hydroxy-phenyl)-4-ethoxycarbonyl-piperidine methanesulfonate (NIH 8169), are morphine-antagonists (see Report of the Committee on Problems of Drug Dependence, 1966, Addendum 2, pages 8 and 9; and Report of the Committee on Drug Addiction and Norcotics, 1965, Addendum, page 9); on the other hand, corresponding tests have shown that the prior art analogs, namely 1-allyl-4-phenyl-4-carbopropoxy-piperidine (NIH 7947) and 1-allyl-4-phenyl-4-carbomethoxy-piperidine (NIH 7946), exhibit no morphine-antagonistic activities in morphine-addicted monkeys (see Bulletin of Drug Addition and Narcotics, 1962, Addendum 2, pages 13and 14.

For pharmaceutical purposes the compounds of the invention are administered to warmblooded animals perorally, parenterally or by the rectal route as active ingredients in customary dosage unit compositions, that is, in compositions in dosage unit form consisting essentially of an inert carrier and one dosage unit of the active ingredient, such as tablet, coated pills, suppositories, emulsions, suspensions, syrups, hypodermic solutions and the like. One dosage unit of a compound according to the present invention is from 0.166 to 5.0 mg./kg. preferably from 0.83 to 2.5 mg./kg.

The following examples illustrate a few dosage unit compositions comprising a compound of the present invention as an active ingredient. The parts are parts by weight unless other wise specified.

EXAMPLE 165

Hypodermic solution

The solution was compounded from the following ingredients:

| | | |
|---|---|---|
| Trans-1-(3'-chloroallyl)-4-(3''-hydroxyphenyl)-4methoxycarbonyl-piperidine hydrochloride | | 100.0 parts |
| Dextrose | | 10.0 |
| Distilled water | q.s.ad by vol. | 2,000.0 parts |

Compounding procedure:

The piperidine compound and the dextrose were dissolved in the distilled water, the solution was filtered until free from suspended particles, and the filtrate was filled into 2 cc., ampuls which were sealed and sterilized. Each ampule contained 100 mg. of the piperidine compound, and when the contents thereof were administered intravenously to a warmblooded animal of about 60 kg. body weight in need of such treatment, very good analgesic effects were produced.

EXAMPLE 166

Tablets

The tablet composition was compounded from the following ingredients:

| | | |
|---|---|---|
| 1-(3'-chloroallyl)-4-(3''-hydroxyphenyl-4-ethoxycarbonyl-piperidine hydrochloride | | 50.0 parts |
| Corn starch | | 30.0 parts |
| Lactose | | 20.0 parts |
| Colloidal silicic acid | | 2.0 parts |
| Gelatin | | 3.0 parts |
| Magnesium stearate | | 2.0 parts |
| Talcum | | 3.0 parts |
| | Total | 110.0 parts |

Compounding procedure:

The individual components were intimately admixed with each other, and the mixture was compressed into 110 mg. tablets. Each tablet contained 50 mg. of the piperidine compound and, when administered perorally to a warmblooded animal of about 60 kg. body weight in need of such treatment, produced very good analgesic effects.

EXAMPLE 167

Drop solution for oral administration

The solution was compounded from the following ingredients:

| | | |
|---|---|---|
| Trans-1-(3'-chloroallyl)-4-(3''-hydroxyphenyl)-4-methoxycarbonyl-piperidine hydrochloride | | 10.0 parts |
| p-Hydroxybenzoic acid methyl ester | | 0.07 parts |
| p-Hydroxybenzoic acid propyl ester | | 0.03 parts |
| Ethanol | | 20.0 parts |
| Polyethyleneglycol 400 | | 20.0 parts |
| Demineralized water | q.s.ad | 100.0 parts by vol. |

Compounding procedure:

The individual ingredients were dissolved in the water, and the solution was filtered. Each centimeter of solution (about five drops) contained 100 mg. of the active ingredient and, when administered perorally to a warmblooded animal of about 60 kg. body weight in need of such treatment, produced very good analgesic effects.

EXAMPLE 168

Suppositories

The suppository composition was compounded from the following ingredients:

| | |
|---|---|
| 1-(3'-chloroallyl)-4-(3''-hydroxyphenyl)-4-ethoxycarbonyl-piperidine hydrochloride | 150.0 parts |
| Lactose | 150.0 parts |
| Cocoa butter | 1,400.0 parts |
| Total | 1,700.0 parts |

Compounding procedure:

The piperidine compound and the lactose were admixed with each other, and the mixture was uniformly blended into the molten cocoa butter. The mixture was then poured into cooled suppository molds, each holding 1,700 mg. of the mixture. Each suppository contained 150 mg. of the piperidine compound and, when administered by the rectal route to a warmblooded animal of about 60 kg. body weight in need of such treatment, produced very good analgesic effects.

Analogous results were obtained when any other compounds of the present invention was substituted for the particular piperidine compound in illustrative example 165 to 168. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to those particular embodiments, and that various changes and modifications may be made without departing from the spirit of the invention or the scope of the appended claims.

We claim:

1. A compound selected from the group consisting of stereoisomeric mixtures of N-γ-chloroallyl-4-phenyl-4-ethoxycarbonyl-piperidine derivatives of the formula

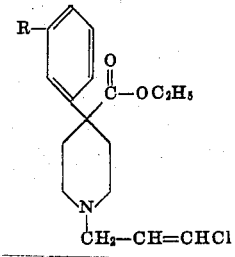

wherein R is selected from the group consisting of hydroxy, methoxy and acetoxy; cis-stereoisomers of said piperidine derivatives, trans-stereoisomers of said piperidine derivatives; nontoxic, pharmacologically acceptable acid addition salts of said stereoisomeric mixtures; nontoxic, pharmacologically acceptable acid addition salts of said cis-stereoisomers; and nontoxic, pharmacologically acceptable acid addition salts of said trans-stereoisomers.

2. A compound according to claim 1, which is 1-(3'-chloroallyl)-4-(3''-hydroxyphenyl)-4-ethoxycarbonyl-piperidine hydrochloride.

3. Trans-1-(3'-chloroallyl)-4-(3''-hydroxyphenyl)-4-methoxycarbonyl-piperidine hydrochloride.

4. 1-(3'-chloroallyl)-4-(3''-hydroxyphenyl)-4-propionyl-piperidine hydrochloride.

5. Cis-1-(3'-chloroallyl)-4-(3''-hydroxyphenyl)-4-methoxylcarbonyl-piperidine hydrochloride.

6. Trans-1-(3'-chloroallyl)-4-(2''-chlorophenyl)-4-propionyl-piperidine hydrochloride.

7. 1-(3'-chloroallyl)-4-(3''-chlorophenyl)-4-methoxycarbonyl-piperidine hydrochloride.

* * * * *

PO-1050
(5/69)

UNITED STATES PATENT OFFICE
CERTIFICATE OF CORRECTION

Patent No. 3,627,772      Dated Dec. 14, 1971

Inventor(s) Kurt Freter, Herbert Merz, Hans-Detlef Schroeder and Karl Zeile

It is certified that error appears in the above-identified patent and that said Letters Patent are hereby corrected as shown below:

Insert --[32] Priorities Jan. 24, 1964
                            Germany
                            B 75,148
                            Feb. 21, 1964
                            Germany
                            B 75,540

Col. 3, line 58 - insert parenthesis before "3'".
Col. 7, line 55 - insert parenthesis before "3"".
Col. 12, line 28 - delete "4g." and insert --4-ethoxycarbonyl-piperidine--.
Col. 13, line 28 - correct the spelling of "methylphenyl".
Col. 16, line 36 - "69" should read --79--;
Col. 16, line 60 - correct the spelling of "hydroxyphenyl";
Col. 16, line 68 - delete ",3'-dichloroallyl)-4-(3" ".
Col. 20, line 71 - correct the spelling of "methylphenyl".
Col. 22, line 47 - " 4" " should read -- 4' --.
Col. 23, line 16 - delete parenthesis after "4".
Col. 25, line 3 - insert "of" before "theory".
Col. 28, line 46 - delete "4" (first occurrence);
Col. 28, line 75 - correct the spelling of "dimethylallyl".
Col. 30, line 64 - delete "3a";
Col. 30, line 73 - insert closing parenthesis after "allyl".
Col. 35, line 72 - "1-(3" " should read -- 1-(3',3' --; delete "Q".
Col. 36, line 43 - " 1-(340,3' " should read -- 1-(3',3' --.

Signed and sealed this 21st day of November 1972.

(SEAL)
Attest:

EDWARD M. FLETCHER, JR.
Attesting Officer

ROBERT GOTTSCHALK
Commissioner of Patents